(12) United States Patent
Krahn et al.

(10) Patent No.: US 12,164,344 B2
(45) Date of Patent: Dec. 10, 2024

(54) HINGES FOR FOLDING DISPLAY DEVICES

(71) Applicant: Apple Inc., Cupertino, CA (US)

(72) Inventors: Scott J Krahn, Cupertino, CA (US); Adam T Garelli, Morgan Hill, CA (US); Bradley J Hamel, Portola Valley, CA (US); Dinesh C Mathew, San Francisco, CA (US); Hoon Sik Kim, San Jose, CA (US); Keith J Hendren, Santa Cruz, CA (US); Robert Y Cao, San Francisco, CA (US); Terry C Lam, Mountain View, CA (US); Kevin M Robinson, Sunnyvale, CA (US); Houtan R Farahani, San Ramon, CA (US); Tatsuya Sano, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/859,668

(22) Filed: Jul. 7, 2022

(65) Prior Publication Data
US 2023/0049811 A1 Feb. 16, 2023

Related U.S. Application Data

(60) Provisional application No. 63/232,021, filed on Aug. 11, 2021.

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| 9,047,055 B2 | 6/2015 | Song |
| 9,173,287 B1* | 10/2015 | Kim ...................... G06F 1/1652 |
| 9,459,656 B2 | 10/2016 | Shai |
| 9,625,947 B2* | 4/2017 | Lee ........................ G06F 1/1616 |

(Continued)

FOREIGN PATENT DOCUMENTS

| KR | 20200120474 A | 10/2020 |
| WO | 2021072431 A1 | 4/2021 |
| WO | 2021118538 A1 | 6/2021 |

*Primary Examiner* — Lisa Lea-Edmonds
(74) *Attorney, Agent, or Firm* — Treyz Law Group, P.C.; Tianyi He

(57) ABSTRACT

A foldable display device may have housing portions coupled by a hinge. The hinge may have a series of interconnected links. The links may be formed from interdigitated fingers in a friction clutch. The fingers or other portions of the links may be provided with crescent-shaped slots that receive pins. During folding of the device, the pins may slide along the crescent-shaped slots, thereby ensuring that adjacent links rotate relative to each other about a rotation axis that lies outside of the hinge and within a flexible display panel. Links may also be formed from link members with curved mating bearing surfaces that slide relative to each other as adjacent links are rotated relative to each other. A housing rotation synchronization mechanism may be formed using a set of gears that extends between the first and second housing portions.

26 Claims, 26 Drawing Sheets

(56) References Cited

U.S. PATENT DOCUMENTS

| | | | |
|---|---|---|---|
| 9,910,458 B2 | 3/2018 | Watanabe et al. | |
| 9,930,794 B2 * | 3/2018 | Luan | H05K 5/0017 |
| 9,946,310 B1 * | 4/2018 | Huang | G06F 1/1681 |
| 10,070,546 B1 * | 9/2018 | Hsu | E05D 11/1028 |
| 10,174,534 B2 * | 1/2019 | Tazbaz | G06F 1/1616 |
| 10,231,347 B2 * | 3/2019 | Seo | H04M 1/022 |
| 10,324,501 B1 * | 6/2019 | Zimmerman | G06F 1/1681 |
| 10,338,638 B2 * | 7/2019 | Park | G06F 1/163 |
| 10,401,917 B1 * | 9/2019 | Dai | G06F 1/1679 |
| 10,890,951 B1 * | 1/2021 | Watamura | G06F 1/1681 |
| 11,163,340 B2 * | 11/2021 | Wang | G06F 1/1652 |
| 2018/0049329 A1 * | 2/2018 | Seo | H04M 1/0216 |
| 2018/0067519 A1 * | 3/2018 | Tazbaz | G06F 1/1637 |
| 2018/0242466 A1 | 8/2018 | Lee et al. | |
| 2020/0103935 A1 | 4/2020 | Hsu | |
| 2020/0383219 A1 * | 12/2020 | Hale | E05D 3/122 |
| 2021/0026417 A1 * | 1/2021 | Morino | G06F 1/1683 |
| 2021/0028387 A1 * | 1/2021 | Large | H10K 77/111 |
| 2022/0051594 A1 * | 2/2022 | Eguchi | H05K 5/0026 |
| 2023/0049811 A1 * | 2/2023 | Krahn | G06F 1/1616 |
| 2023/0094134 A1 * | 3/2023 | Large | H10K 71/00 |

* cited by examiner

HINGES FOR FOLDING DISPLAY DEVICES

This application claims the benefit of provisional patent application No. 63/232,021, filed Aug. 11, 2021, which is hereby incorporated by reference herein in its entirety.

FIELD

This relates generally to electronic devices, and, more particularly, to electronic devices with displays.

BACKGROUND

Electronic devices often have displays. Portability may be a concern for some devices, which tends to limit available real estate for displays.

SUMMARY

A foldable electronic device may have a display formed from a flexible display panel that overlaps a bend axis. The device may have first and second housing portions coupled by a hinge. The device may be opened and closed by rotating first and second housing portions about the bend axis.

The hinge may have a series of interconnected links. The links may be formed from thin sheets of material that form interdigitated fingers in a friction clutch. The fingers or other portions of the links may be provided with crescent-shaped slots that receive pins. During folding of the device, the pins may slide along the crescent-shaped slots, thereby ensuring that adjacent links rotate relative to each other about a rotation axis that lies outside of the hinge and within the flexible display panel supported over the links.

If desired, links may be formed from link members with curved mating bearing surfaces that slide relative to each other as adjacent links are rotated relative to each other. A housing rotation synchronization mechanism may be formed using a set of gears that extends between the first and second housing portions.

DETAILED DESCRIPTION

Electronic devices may be provided with displays. Displays may be used for displaying images for users. Displays may be formed from arrays of light-emitting diode pixels or other pixels. For example, a device may have an organic light-emitting diode display or a display formed from an array of micro-light-emitting diodes (e.g., light-emitting diodes formed from crystalline semiconductor dies).

Figure 1:
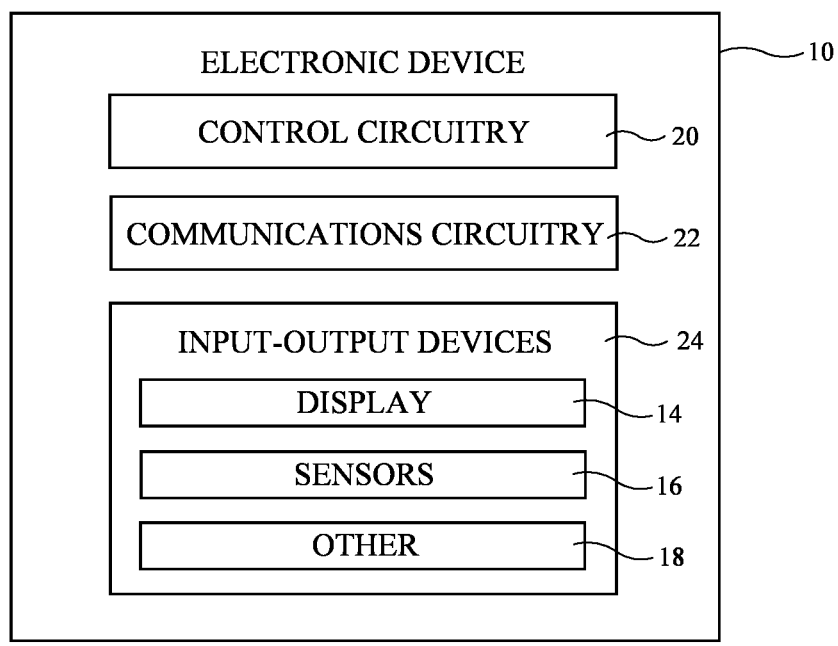
FIG. 1 is a schematic diagram of an illustrative electronic device in accordance with an embodiment.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a cellular telephone, tablet computer, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display or microLED display are sometimes described herein as an example.

Display 14 may have an array of pixels configured to display images for a user. The pixels may be formed as part of a display panel that is bendable. This allows device 10 to be folded and unfolded about a bend axis. For example, a flexible (bendable) display in device 10 may be folded so that device 10 may be placed in a compact shape for storage and may be unfolded when it is desired to view images on the display.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
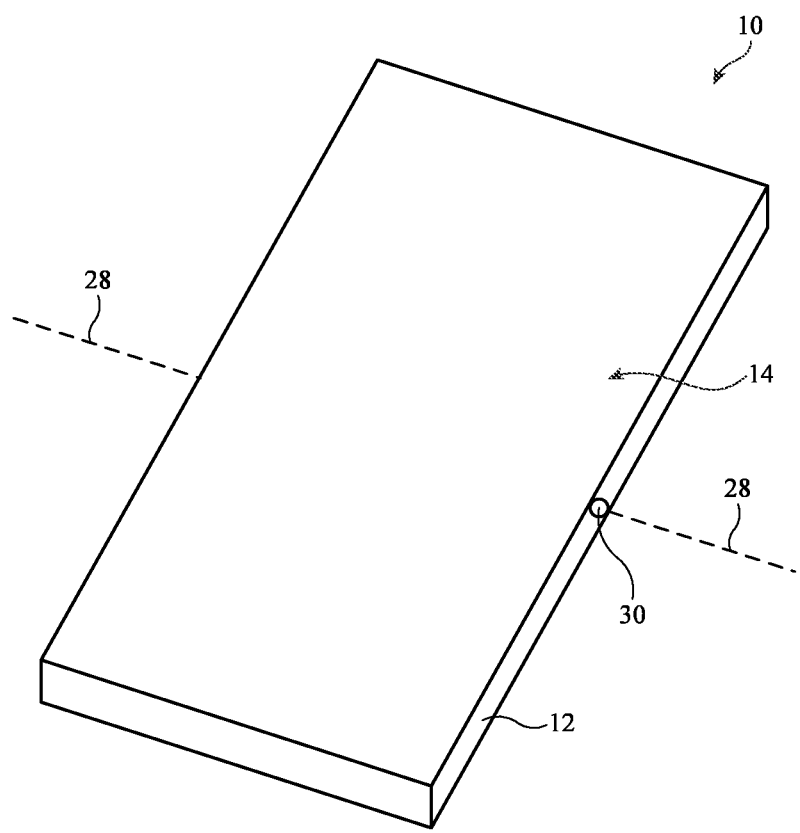
FIG. 2 is a perspective view of an illustrative electronic device with a display in accordance with an embodiment.

FIG. 2 is a perspective view of electronic device 10 in an illustrative configuration in which device 10 is a portable electronic device such as a cellular telephone or tablet computer. As shown in FIG. 2, device 10 may have a display such as display 14. Display 14 may cover some or all of the front face of device 10. Touch sensor circuitry such as two-dimensional capacitive touch sensor circuitry may be incorporated into display 14.

Display 14 may be mounted in housing 12. Housing 12 may form front and rear housing walls, sidewall structures, and/or internal supporting structures (e.g., a frame, an optional midplate member, etc.) for device 10. Glass structures, transparent polymer structures, and/or other transparent structures that cover display 14 and other portions of device 10 may provide structural support for device 10 and may sometimes be referred to as housing structures. For example, a transparent housing portion such as a glass or polymer housing structure that covers and protects a pixel array in display 14 may serve as a display cover layer for the pixel array while also serving as a housing wall on the front face of device 10. In configurations in which a display cover layer is formed from glass, the display cover layer may sometime be referred to as a display cover glass or display cover glass layer. The portions of housing 12 on the sidewalls and rear wall of device 10 may be formed from glass or other transparent structures and/or opaque structures. Sidewalls and rear wall structures may be formed as extensions to the front portion of housing 12 (e.g., as integral portions of the display cover layer) and/or may include separate housing wall structures.

Housing 12 may have flexible structures (e.g., bendable housing wall structures) and/or hinge structures such as hinge 30. Hinge 30 may have a hinge axis aligned with device bend axis 28. Hinge 30 and/or flexible housing structures that overlap bend axis 28 may allow housing 12 to bend about bend axis 28. For example, housing 12 may have a first portion on one side of bend axis 28 and a second portion on an opposing side of bend axis 28 and these two housing portions may be coupled by hinge 30 for rotational motion about axis 28.

As housing 12 is bent about bend axis 28, the flexibility of display 14 allows display 14 to bend about axis 28. In an illustrative configuration, housing 12 and display 14 may bend by 180°. This allows display 14 to be folded back on itself (with first and second outwardly-facing portions of display 14 facing each other). The ability to place device 10 in a folded configuration in this way may help make device 10 compact so that device 10 can be stored efficiently. When it is desired to view images on display 14, device 10 may be unfolded about axis 28 to place device 10 in the unfolded configuration of FIG. 2. This allows display 14 to lie flat and allows a user to view flat images on display 14. The ability to fold display 14 onto itself allows device 10 to exhibit an inwardly folding behavior. Display 14 may be sufficiently flexible to allow device 10 to be folded outwardly and/or inwardly.

Device 10 of FIG. 2 has a rectangular outline (rectangular periphery) with four corners. As shown in FIG. 2, a first pair of parallel edges (e.g., the left and right edges of device 10 in the example of FIG. 2) may be longer than a second pair of parallel edges (e.g., the upper and lower edges of device 10 of FIG. 2) that are oriented at right angles to the first pair of parallel edges. In this type of configuration, housing 12 is elongated along a longitudinal axis that is perpendicular to bend axis 28. Housing 12 may have other shapes, if desired (e.g., shapes in which housing 12 has a longitudinal axis that extends parallel to bend axis 28). With an arrangement of the type shown in FIG. 2, the length of device 10 along its longitudinal axis may be reduced by folding device 10 about axis 28.

Figure 3:
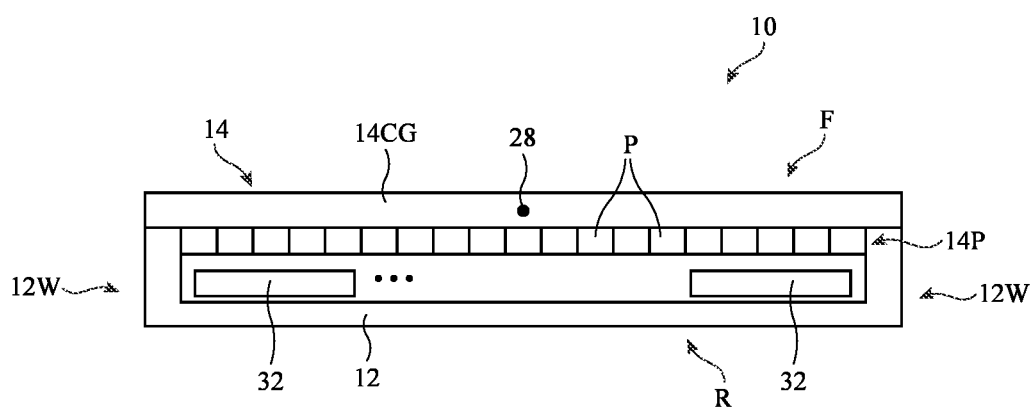
FIG. 3 is a cross-sectional side view of an illustrative electronic device in accordance with an embodiment.

FIG. 3 is a cross-sectional side view of an illustrative foldable electronic device. Device 10 of FIG. 3 may bend about bend axis 28. Bend axis 28 may be aligned with display cover layer 14CG or other structures in device 10. For example, bend axis 28 may pass through a portion of display cover layer 14CG or may be located above or below layer 14CG.

As shown in FIG. 3, display 14 includes an array of pixels P forming display panel 14P under an inwardly facing surface of display cover layer 14CG. Display panel 14P may be, for example, a flexible organic light-emitting diode display or a microLED display in which light-emitting pixels are formed on a flexible substrate layer (e.g., a flexible layer of polyimide or a sheet of other flexible polymer). Flexible support layer(s) for display 14 may also be formed from flexible glass, flexible metal, and/or other flexible structures.

Display cover layer 14CG may be formed from polymer, glass, crystalline materials such as sapphire, other materials, and/or combinations of these materials. To locally increase flexibility, a portion of layer 14CG that overlaps and extends along bend axis 28 (e.g., a strip-shaped region running along axis 28 and hinge 30) may be locally thinned (e.g., this portion may be thinned relative to portions of layer 14CG that do not overlap bend axis 28). The thickness of layer 14CG (e.g., the non-thinned portions of layer 14CG) may be 400 microns, 50-600 microns, 70-150 microns, 100-500 microns, 200-600 microns, at least 100 microns, at least 300 microns, less than 600 microns, less than 500 microns, less than 250 microns, less than 150 microns, less than 100 microns, at least 50 microns, or other suitable thickness. In an illustrative configuration, the unthinned portion of layer 14CG has a thickness of 400 microns and the locally thinned portion of layer 14CG has a thickness of 100-200 microns (as an example). Other arrangements for layer 14CG may be used, if desired.

In the example of FIG. 3, housing 12 has a portion on rear face R that forms a rear housing wall and has side portions forming sidewalls 12W. The rear housing wall of housing 12 may form a support layer for components in device 10. Housing 12 may also have one or more interior supporting layers (e.g., frame structures such as an optional midplate, etc.). These interior supporting layers and the rear housing wall may have first and second portions that are coupled to opposing sides of a hinge that is aligned with bend axis 28 (see, e.g., hinge 30 of FIG. 2) or may be sufficiently flexible to bend around bend axis 28.

Electrical components 32 may be mounted in the interior of device 10 (e.g., between display 14 and the rear of housing 12. Components 32 may include circuitry of the type shown in FIG. 1 (e.g., control circuitry 20, communications circuitry 22, input-output devices 24, batteries, etc.). Display 14 may be mounted on front face F of device 10. When device 10 is folded about axis 28, display cover layer 14CG, display panel 14P, and the other structures of device 10 that overlap bend axis 28 may flex and bend to accommodate folding.

Figure 4:
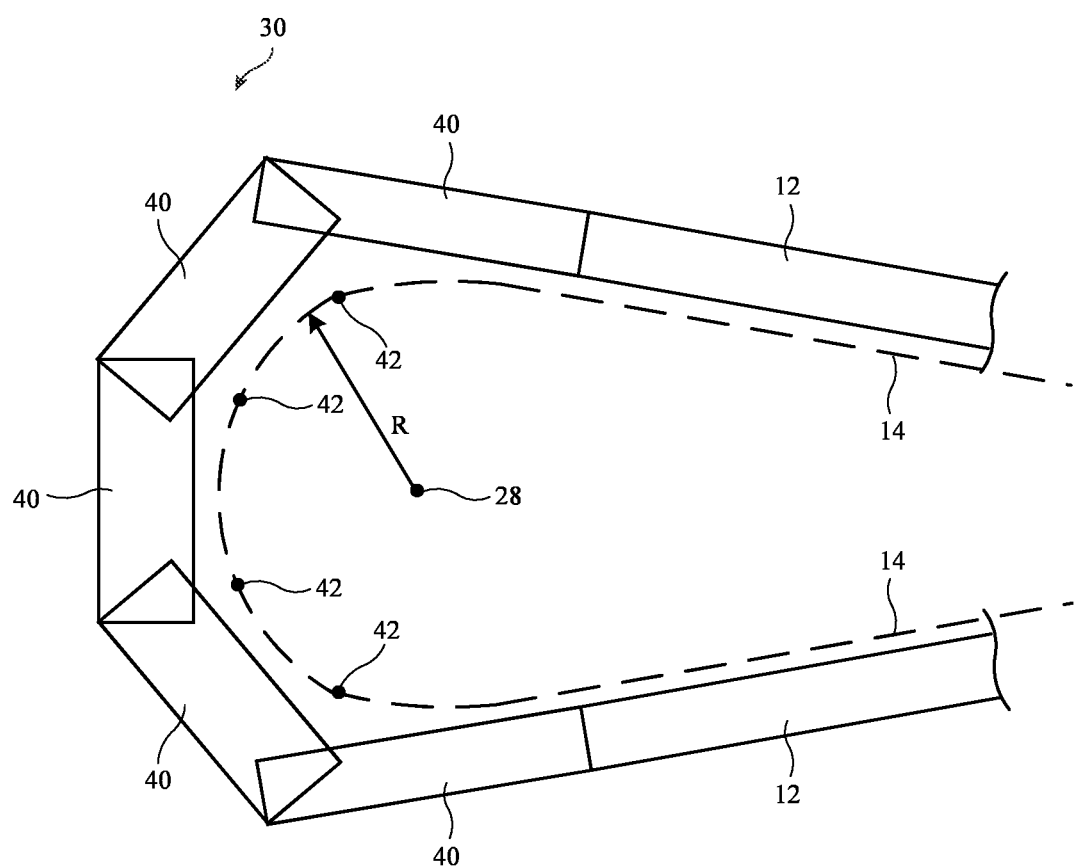
FIG. 4 is a side view of a portion of an illustrative electronic device having a hinge with links in accordance with an embodiment.

Hinge 30 may have a multilink design. As shown in FIG. 4, for example, hinge 30 may have multiple interconnected portions such as hinge links 40. Links 40 may be coupled to each other for rotational motion and may extend in a linked series between first and second portions of housing 12 (e.g., the portions of housing 12 of FIG. 2 that rotate with respect to each other). Each pair of adjacent hinge links may be restricted in its amount of overall rotation. For example, links 40 may be configured so that no two adjacent links 40 are allowed to rotate more than a maximum rotation angle RA with respect to each other where RA has a value of less than 180°, less than 90°, less than 45°, less than 25°, 5-50°, or other suitable amount. With this arrangement, links 40 collectively allow hinge 30 to rotate by a desired amount (e.g., 180°) without creating an excessively small bend radius for display 14 about bend axis 28. The value of RA may be the same for all pairs of adjacent links 40 or different pairs of adjacent links may have different values of RA. As an example, the angle RA may be 30° for the link pairs that are adjacent to housing 12, whereas the angle RA may be 60° for the link pairs in the middle of hinge 30. Arrangements where each link rotates by the same maximum angle RA with respect to its neighboring links and/or in which the middle links 40 in hinge 30 have higher RA values than the links immediately adjacent to housing 12 may also be used, if desired.

With an illustrative arrangement, links 40 may have crescent shaped slots with mating pins and/or other structures (e.g., links with mating crescent-shaped bearing surfaces) that place the axes of rotations of the links outside of the layer of links themselves. As shown in FIG. 4, for example, each link in a pair of adjacent links may rotate with respect to the other about a rotational axis 42 that is located outside of the links towards hinge bend axis 28. Although each adjacent set of links can only rotate by a limited amount in this type of arrangement, the overall amount of bending of display 14 may be 180° or more by using multiple links 40 in hinge 30, thereby allowing display 14 to fold back on itself. To help minimize bending stress on display 14, display 14 may be placed in alignment with axes 42. The bend radius R of display 14 when device 10 is folded shut may be sufficient to prevent excess stress to display 14. For example, R may have a value of 5 mm, at least 1 mm, at least 3 mm, less than 10 mm, less than 6 mm, 2-7 mm, or other suitable value).

Figure 5:
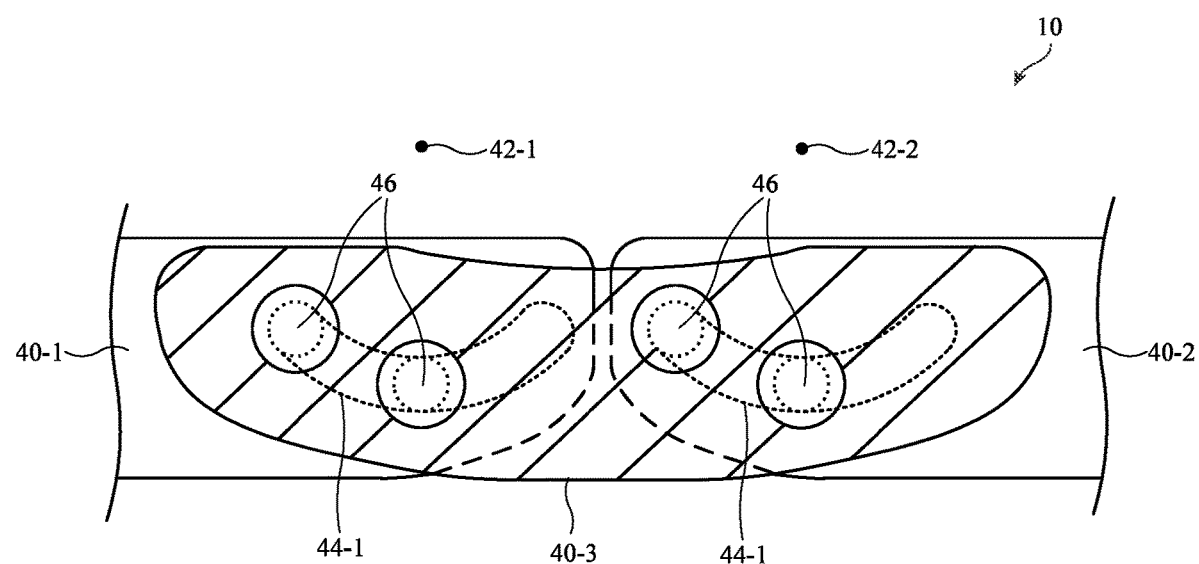
FIG. 5 is a side view of a portion of an illustrative hinge in accordance with an embodiment.

FIG. 5 is a side view of a set of multiple hinge links 40 in a portion of hinge 30. There may be any suitable number of hinge links 40 in hinge 30. There may be, for example, at least 2 links 40, at least 3 links 40, at least four links 40, 5-10 links 40, at least 10 links 40, fewer than 15 links 40, fewer than 7 links 40, fewer than 5 links 40, or other suitable number of links 40 in hinge 30. In the example of FIG. 5, link 40-1 has crescent-shaped slot 44-1 and link 40-2 has crescent-shaped slot 44-2. Pins 46 and link 40-3 may be used to couple links 40-1 and 40-2. During operation, pins 46 and the slots of hinge 30 allow adjacent links 40-1 and 40-3 to rotate with respect to each other about rotational axis 42-1 and allow adjacent links 40-3 and 40-2 to rotate with respect to each other about rotational axis 42-2. As shown in FIG. 5, rotational axes 42-1 and 42-2 are located out of the plane of links 40 (e.g., above links 40), which allows display 14 (e.g., a flexible thin-film display such as a flexible thin-film organic light-emitting diode display, a microLED display, or other flexible display) to be mounted so that potentially sensitive thin-film layers of the display, a display cover layer in the display, and/or other sensitive portions of the display are aligned with axes 42-1 and 42-2. In this way, the locations of axes 42-1 and 42-2 may establish a neutral stress plane for display 14 that coincides with the thin-film layers, display cover layer, and/or other sensitive portions of display 14.

The lengths of the crescent-shaped slots and the amount of curvature of each slot may be selected to adjust the locations of axes 42-1 and 42-2 (e.g., the distance of these axes above links 40) and to adjust the amount of permitted rotation of each link with respect to the next. If, as an example, slots 44-1 and 44-2 are nearly straight, axes 42-1 and 42-2 will be relatively far from links 44, whereas if slots 44-1 and 44-2 exhibit strong curvature, then axes 42-1 and 42-2 will be close to links 44. For a given curvature, slot length affects the amount of permitted motion. If the slots are long, more rotational motion of the links will be permitted (because pins 46 will have farther to slide along the length of the slots), whereas if the slots are short, less rotational motion of the links will be permitted before the pins reach the ends of the slots and are prevented from sliding further.

To maintain satisfactory friction between rotating parts of device 10, hinge 30 may be provided with friction clutch structures. As an example, adjacent links 40 and/or other portions of hinge 30 may be provided with interdigitated sets of fingers that are pressed together to create rotational friction when rotating with respect to each other. These friction-producing structures, which may sometimes be referred to as friction clutch structures, a friction clutch, a hinge friction structure, rotational friction structures, etc., may be integrated into links 40, may be attached to links 40 so that the friction-producing structures produce rotational friction for the attached links 40, and/or may otherwise be coupled between portions of housing 12 that rotate with respect to each other. The friction produced by the friction clutch structures allows a first portion of housing 12 to be maintained in a desired rotational orientation with respect to a second portion of housing 12 (e.g., housing halves may be placed perpendicular or nearly perpendicular to each other, may be closed onto each other, may be placed in an open planar configuration, and/or may otherwise be positioned as desired by rotating these portions with respect to each other about bend axis 28 of hinge 30).

Figure 6:
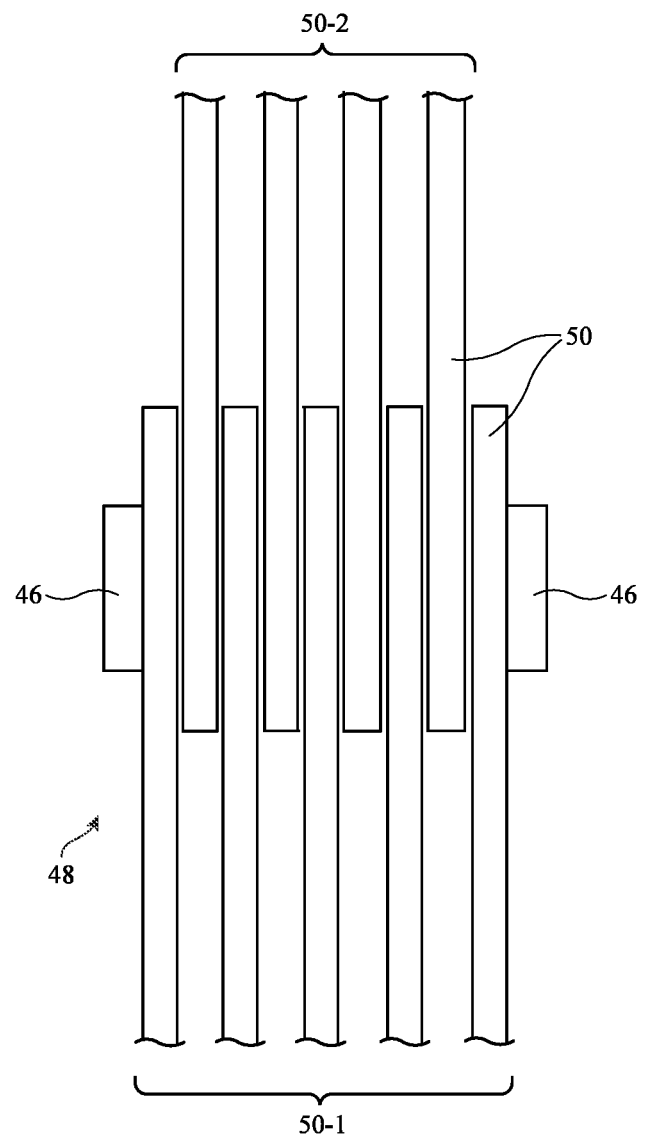
FIG. 6 is a top view of an illustrative friction hinge having interleaved hinge fingers in accordance with an embodiment.

FIG. 6 is a top view of a friction clutch formed from interdigitated friction clutch members. In the example of FIG. 6, clutch 48 has a first set of fingers 50 (e.g., first fingers 50-1) and a second set of fingers 50 (e.g., second fingers 50-2). Fingers 50 in the first and second sets are interdigitated. Pin 46 may be configured to press fingers 50 towards each other along the axis passing through pin 46. Fingers 50 may be relatively thin (e.g., fingers 50 may have a relatively small dimension along the axis of pin 46) and may have relatively larger surface areas where fingers 50 contact each other (e.g., fingers 50 may form blade-shaped members). This allows satisfactory friction to be created without requiring an overly bulky clutch. Pins 46 may be configured to squeeze fingers 50-1 and 50-2 together to impart a desired amount of friction (e.g., sufficient friction to hold first and second portions of housing 12 at a desired angle relative to each other when the first portion is resting on a surface).

In an illustrative configuration, a pair of pins 46 are used to couple each adjacent set of fingers 50 and each adjacent set of fingers 50 forms a corresponding link 40. The pair of pins 46 may travel within a crescent shaped slot in the set of fingers 50 that form the link, as described in connection with slots 44-1 an 44-2 of FIG. 5.

Figure 7:
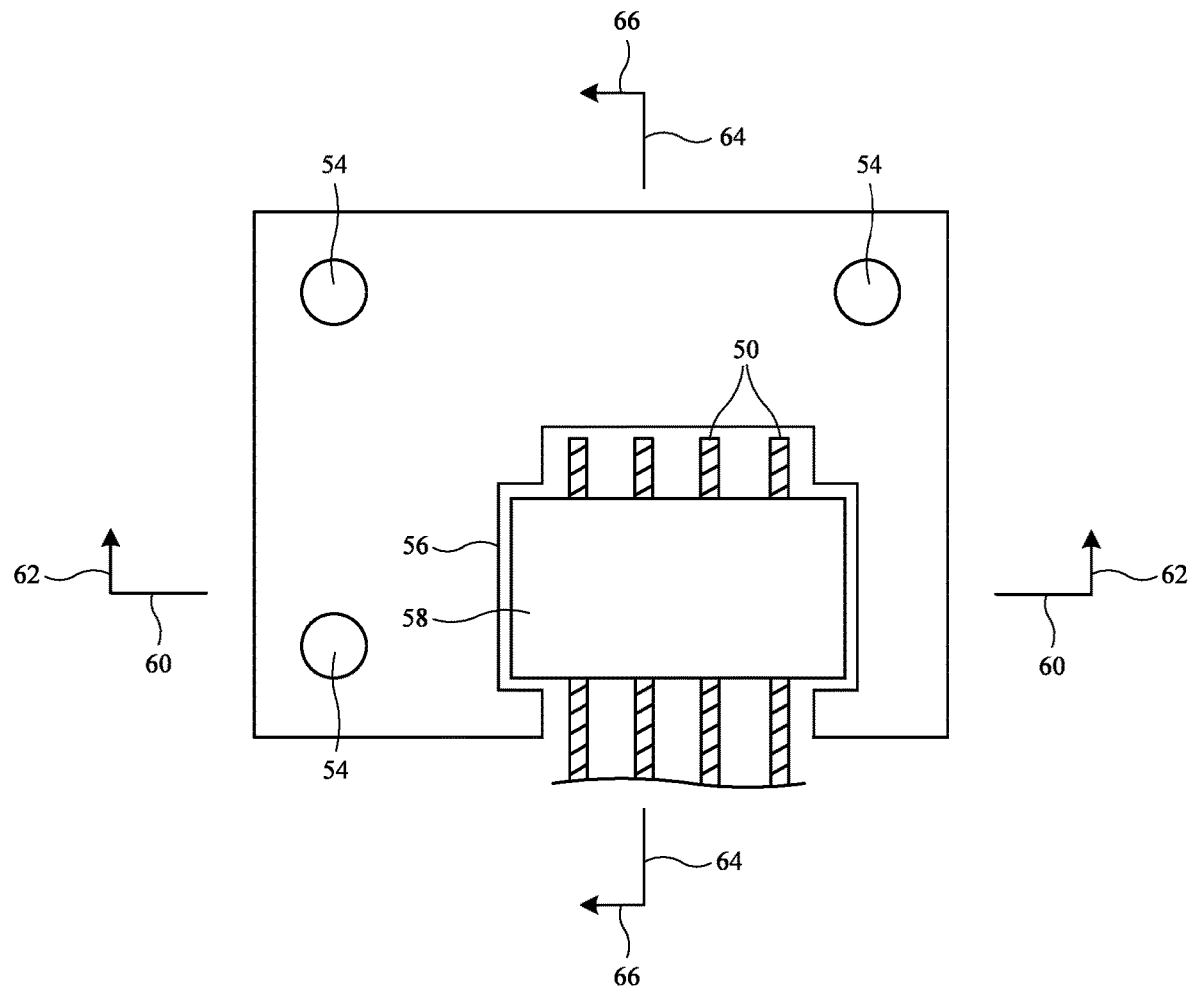
FIG. 7 is a top view of a portion of an illustrative electronic device having structures coupled to friction hinge fingers in accordance with an embodiment.

Fingers 50 may be coupled to housing 12 using any suitable arrangement (e.g., using welds, adhesive, fasteners, press-fit connections, interlocking engagement structures such as interlocking clips, and/or other mounting structures). In the example of FIG. 7, fingers 50 (e.g., fingers 50 in one of hinge links 40) are being attached to hinge mounting member 52. Hinge mounting member 52, which may sometimes be referred to as a housing structure or housing portion, may be formed as an integral portion of a housing wall or other structure(s) of housing 12 (e.g., member 52 may form part of one of the halves of housing 12 that rotate relative to each other) or may be formed from a separate structure that is attached to a portion of housing 12. There may be, as an example, a pair of members 52 attached to one half of housing 12 (e.g., at opposing ends of axis 28) and another pair of members 52 attached to corresponding portion of another half of housing 12 (and optionally additional pairs of members 52 at one or more additional locations along the length of axis 28). Hinge 30 may have a first set of links that form a first hinge portion spanning between two of members 52 (e.g., at one end of axis 28) and may have a second set of links that form a second hinge portion spanning between two more of members 52 (e.g., at an opposing end of axis 28). Arrangements with a different number of hinge structures coupled to members 52 and/or different numbers of members 52 may also be used.

As shown in FIG. 7, each member 52 may have openings such as through-hole openings 54 that allow screws or other fasteners to be used to attach member 52 to housing 12. If desired, fingers 50 may be received within one or more recesses in member 52 such as recess 56. Fingers 50 may be mounted in recess 56 under a mounting plate such as plate 58 that helps hold fingers 50 within recess 56. Plate 58 may be attached to member 52 using welds, adhesive, fasteners, press-fit connections, interlocking engagement structures, and/or other mounting structures.

Figure 8:
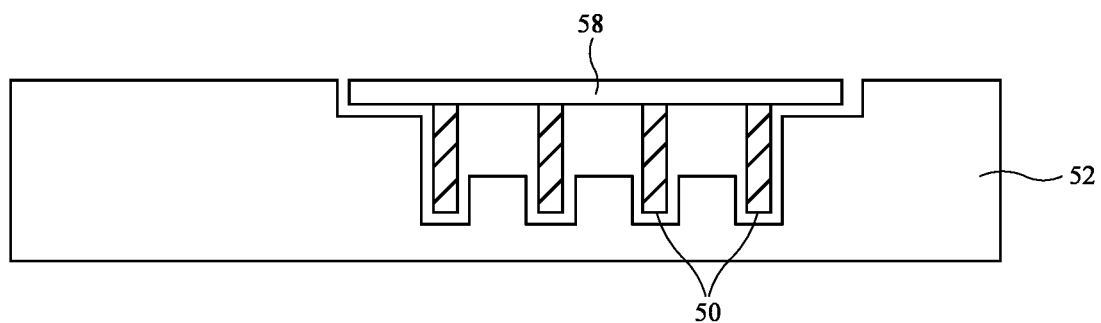
FIGS. 8 and 9 are cross-sectional side views of illustrative electronic device portion of FIG. 7 in accordance with embodiments.
Figure 9:
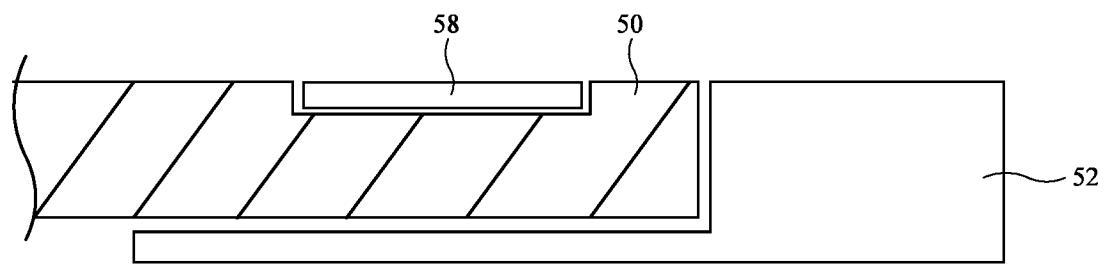

A cross-sectional side view of fingers 50 of FIG. 7 taken along line 60 and viewed in direction 62 is shown in FIG. 8. A cross-sectional side view of fingers 50 of FIG. 7 taken along line 64 and viewed in direction 66 is shown in FIG. 9. Other configurations for coupling fingers 50 (and links 40 formed from fingers 50 and/or other structures) may be used, if desired. The configuration of FIGS. 6, 7, and 8 is illustrative.

Figure 10:
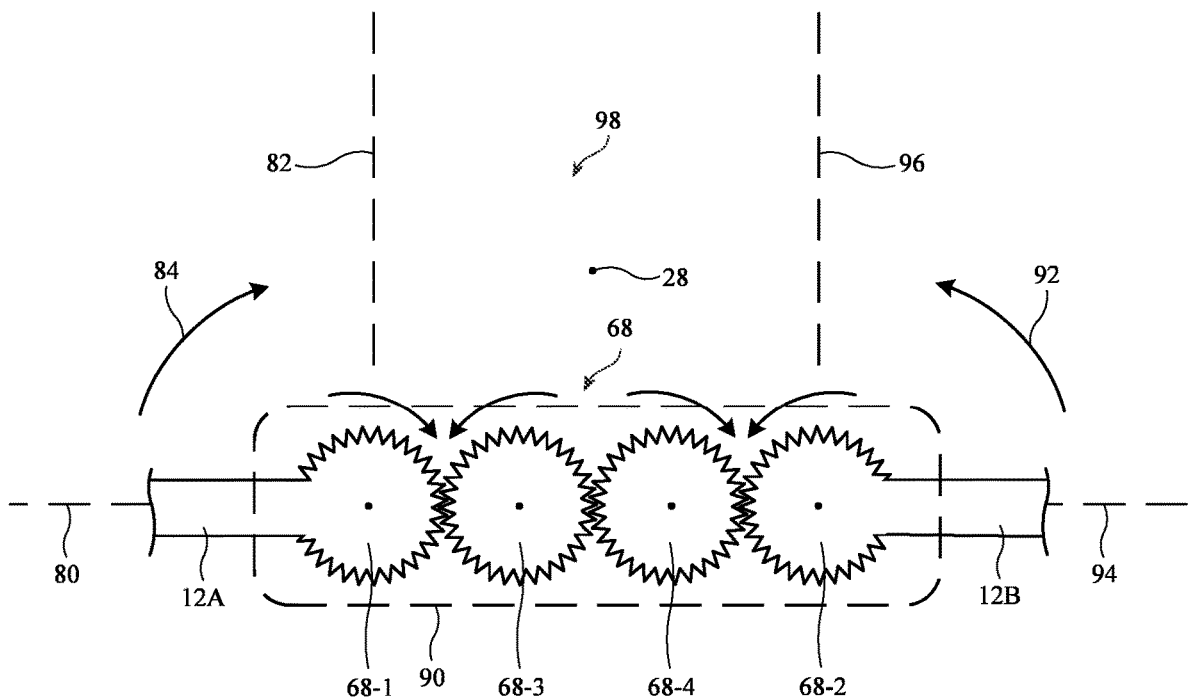
FIG. 10 is a side view of a portion of hinge with a rotation synchronization mechanism formed from interlocked gears in accordance with an embodiment.

To help ensure that links 40 rotate evenly throughout hinge 30, device 10 may have intermeshed gears that extend between rotating portions of housing 12 (e.g., in parallel with hinge 30). The gears and/or other rotation synchronization structures may help ensure that movement of a first half of housing 12 will produce equal and opposite movement of an opposing second half of housing 12. An illustrative rotation synchronization mechanism (mechanism 98 of FIG. 10) with gears 68 of the type that may be used for rotational (angular movement) synchronization in hinge 30 are shown in FIG. 10. In the example of FIG. 10, a first half of housing 12 (housing portion 12A) and a second half of housing 12B are coupled using hinge 30 (see, e.g., FIG. 4). During operation, housing portions 12A and 12B can rotate with respect to each other about axis 28. Angular movement synchronization gears 68, which are mounted to gear support structure 90 and rotate with respect to structure 90, are coupled in series between housing portion 12A (which is connected to gear 68-1 and does not rotate relative to gear 68-1) and housing portion 12B (which is connected to gear 68-2 and does not rotate relative to gear 68-1). This arrangement causes rotation of one side of device 10 to cause equal and opposite rotation of the other side of device 10.

Consider, as an example, a scenario in which device 10 is lying flat on a table in its open state. A user who desires to close device 10, rotates portion 12A from flat position 80 to upright position 82 (e.g., portion 12A is rotated in direction 84 by 90°). The movement of housing portion 12A in direction 84 causes gear 68-1 to rotate clockwise, which causes adjacent gear 68-3 to rotate counterclockwise and thereby causes gear 68-4 to rotate clockwise. Clockwise rotation of gear 68-4 causes gear 68-2 to rotate counterclockwise. Housing portion 12B is attached to gear 68-2, so counterclockwise rotation of gear 68-4 causes housing portion 12B to rotate in counterclockwise direction 92 from initial position 94 to final position 96 (e.g., the rotational movement of housing portion 12B is synchronized to that of housing portion 12A).

The use of a set of four gears in rotation synchronization mechanism 98 of FIG. 10 is presented as an example. Mechanism 98 may have a different number of gears, if desired, (e.g., 4-12 gears 68, at least 4 gears 68, at least 8 gears 68, fewer than 20 gears 68, fewer than 10 gears 68, fewer than 5 gears 68, and/or other suitable number of angular movement synchronization gears).

Figure 11:
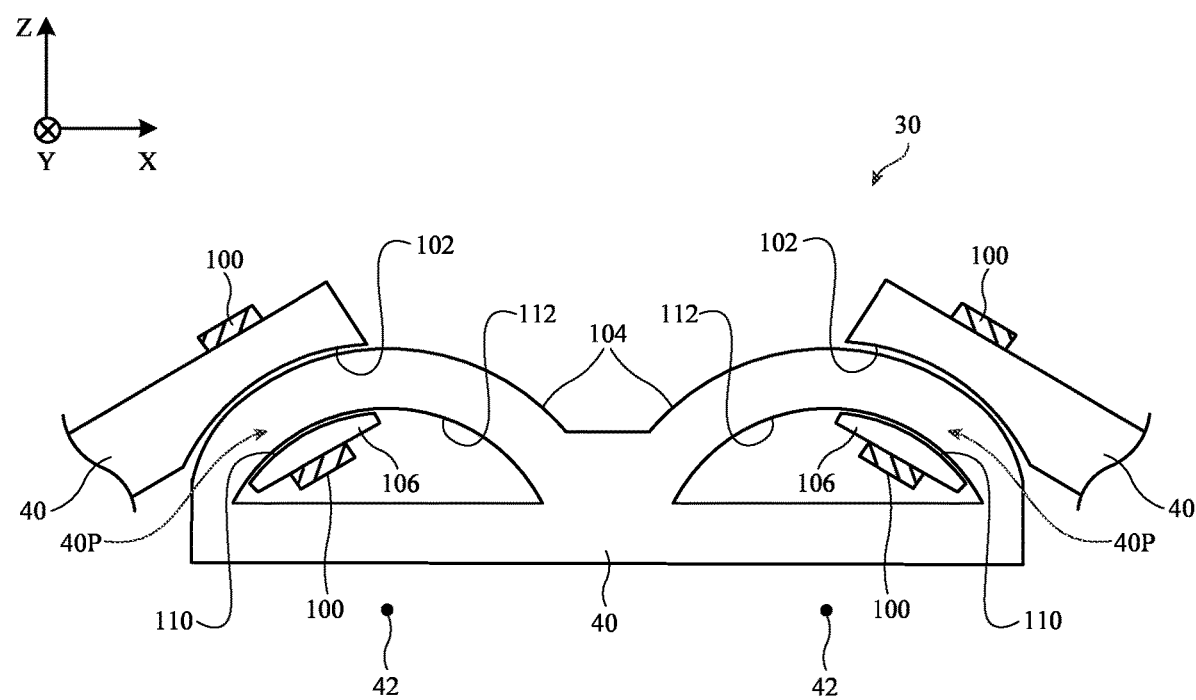
FIG. 11 is a side view of a portion of an illustrative hinge in accordance with an embodiment.

If desired, the curved inwardly facing surfaces of the crescent-shaped slots may be replaced by curved (crescent-shaped) outwardly facing surfaces in links 40. Consider, as an example, illustrative hinge 30 of FIG. 11. As shown in FIG. 11, portions of links 40 in hinge 30 may, if desired, have curved crescent-shaped surfaces such as outwardly facing curved surfaces 104 and mating inwardly facing curved surfaces 102. Links 40 may be held together using attachment members 100 (e.g., threaded screws or other fasteners that travel within slots in portions 40P of links 40). Each of members 100 may have a first portion attached to a link 40 and a second portion that is attached to corresponding retention member 106. Retention members 106 may help hold surfaces 102 against surfaces 104 as links 40 slide along their mating curved surfaces relative to each other (and thereby rotate about rotation axes 42 that lie outside of the plane of the links). The amount of tightening exerted by each member 10 may be used to adjust the amount of friction exhibited by hinge 30, so that links 40 can serve as a friction clutch that imparts a desired amount of friction to hinge 30 (e.g., sufficient friction to hold first and second portions of housing 12 at a desired angle relative to each other when the first portion is resting on a surface). Members 106 each have an outwardly curved (crescent-shaped) surface 110 that slides along a corresponding inwardly curved (crescent-shaped) link surface 112. Any number of links 40 having external surfaces with curved cross-sectional surfaces such as surfaces 104 and 102 of FIG. 11 may be used in forming hinge 30. For example, hinge 30 may have at least 3, at least 5, at least 10, fewer than 15, fewer than 7, fewer than 4, or other suitable number of links 40 of FIG. 11. The configuration of FIG. 11 is presented as an example.

Figure 12:
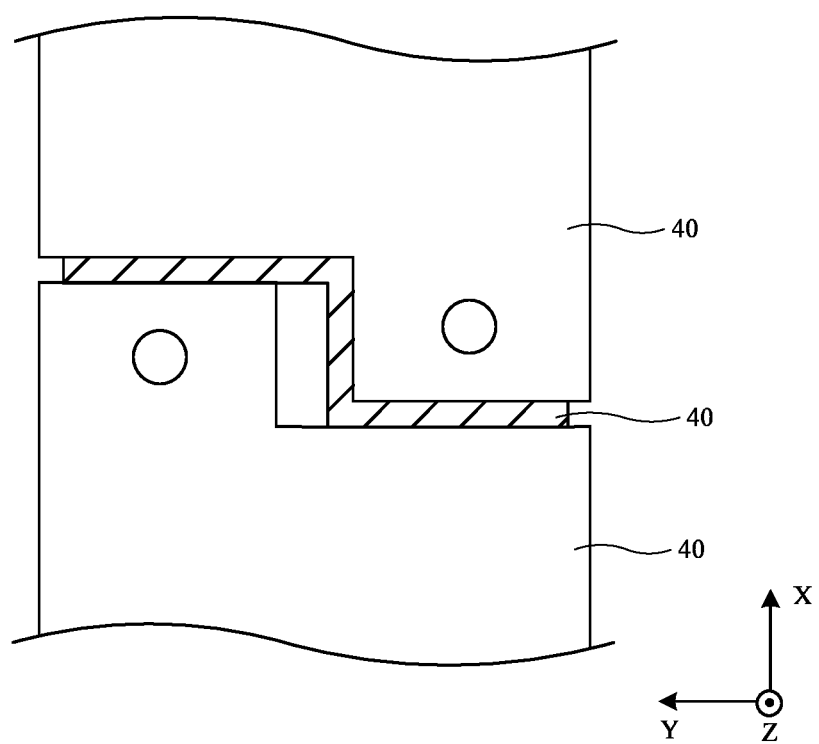
FIG. 12 is a top view of a portion of an illustrative hinge in accordance with an embodiment.

Links 40 may have rectangular outlines (footprints when viewed from above) or may have other suitable shapes. The example of FIG. 12, which shows an illustrative top view of links 40 of the type shown in FIG. 11, illustrates how links 40 may, if desired, have a staircase-shaped edge where these links abut. Other link shapes may be used, if desired.

Figure 13:
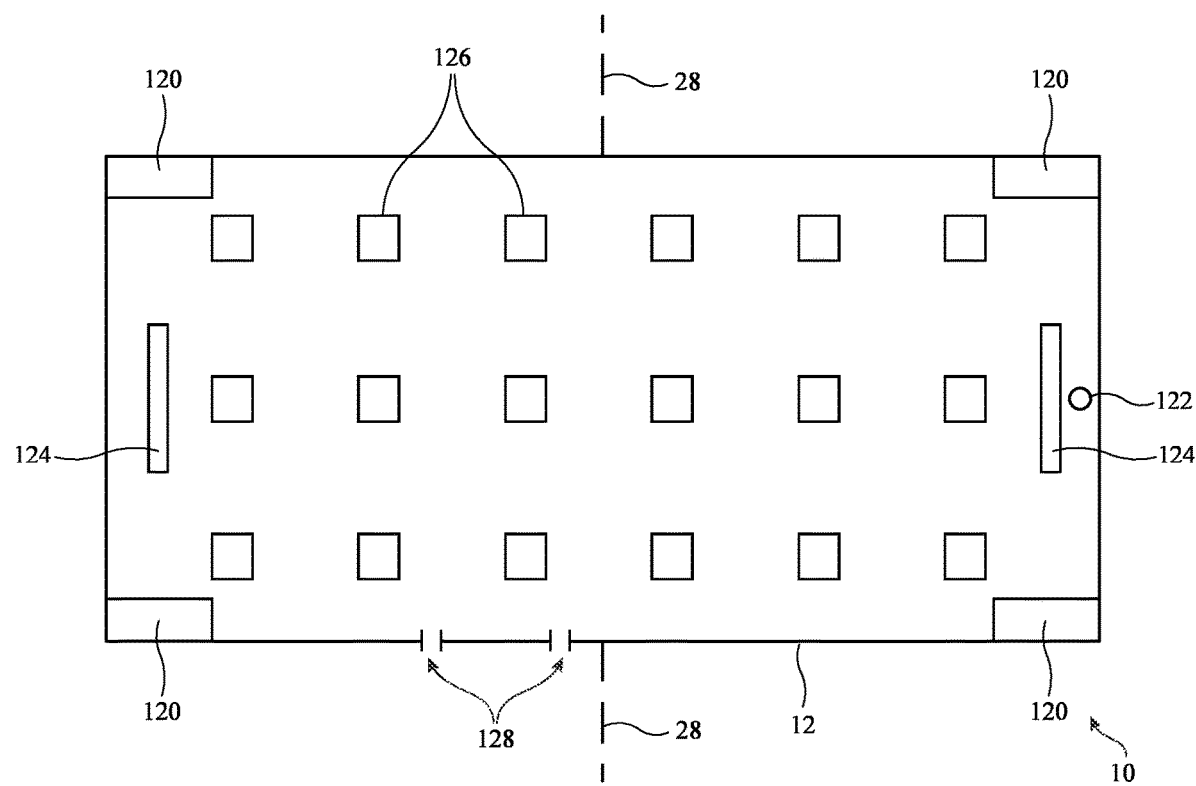
FIG. 13 is a top view of an illustrative electronic device in accordance with an embodiment.

FIG. 13 is a top view of device 10 showing how components may be arranged within device 10 (in an illustrative embodiment). As shown in FIG. 13, speakers 120 may be mounted at the four corners of device 10. Camera 122 and/or other sensors (e.g., an ambient light sensor, three-dimensional image sensor, etc.) may be located at one of the ends of device 10 (so that the camera can be used to capture the face of a user when device 10 is partly folded into a laptop configuration). An array of haptic output devices 126 may be arranged in an array (e.g., a two-dimensional array having multiple rows and multiple columns) to provide display 14 (which overlaps devices 126) with haptic feedback functionality. Display timing controller integrated circuits (TCONs) 124 may be located at opposing ends of display 14 (e.g., so that each TCON can handle display driving operations for a respective half of display 14). If desired, the outer periphery of housing 12 may have a metal band that is divided into multiple segment using gaps such as gaps 128. With this type of arrangement, each segment may, if desired, form an antenna resonating element for an inverted-F antenna or other antenna (e.g., for cellular telephone transmissions, wireless local area network transmissions, and/or other wireless communications).

Figure 14:
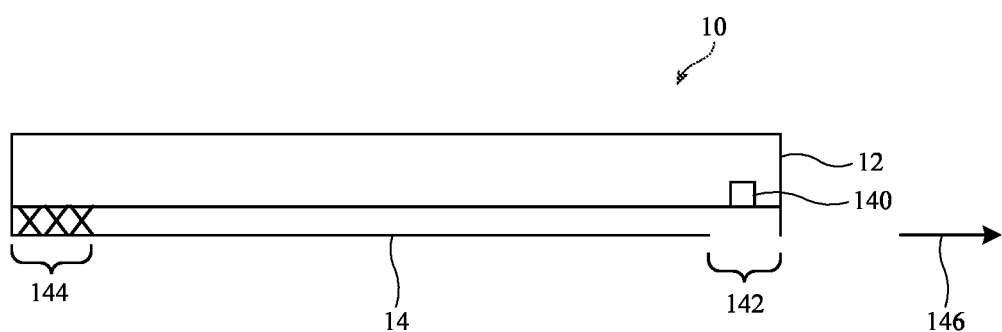
FIG. 14 is a side view of an illustrative electronic device in accordance with an embodiment.

FIG. 14 is a side view of an illustrative electronic device in accordance with an embodiment. As shown in FIG. 14, display 14 may be attached to one end of housing 12 (e.g., in attachment region 144 and may have an opposing end that floats with respect to housing 12. Springs or other tensioning mechanisms may be used to tension the floating end of display 14 in direction 146 to help hold display flat. When device 10 is folded, display 14 may cover region 142. When device 10 is unfolded, display 14 may be retracted from region 142. Components 140 (e.g., a camera and/or other optical components) may be mounted in region 142, so that these components are uncovered as the end of display 14 is pulled away from region 142 during device opening.

Figure 15:
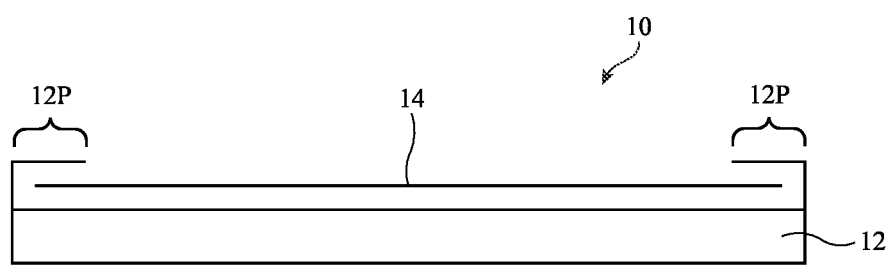
FIG. 15 is a cross-sectional end view of the illustrative electronic device of FIG. 14 in accordance with an embodiment.

FIG. 15 is a cross-sectional end view of device 10 of FIG. 14 showing how the edges of display 14 may be confined within channels formed by overlapping portions 12P of housing 12. Other arrangements for aligning and guiding display 14 as device is opened and closed may be used, if desired.

Display 14 may be formed from a flexible organic light-emitting diode panel or other flexible pixel array overlapped by a protective layer. The protective layer may be, for example, a display cover layer formed from a thin layer of transparent material such as glass. When the cover layer is folded, the cover layer will tend to exhibit a restoring force (sometimes referred to as an unfolding force). This resorting force attempts to unfold housing 12. Left unopposed, this unfolding (opening) torque from the folded display may not be appealing to users of device 10 and may make it challenging to stabilize device 10 in a desired partly-opened state.

Figure 16:
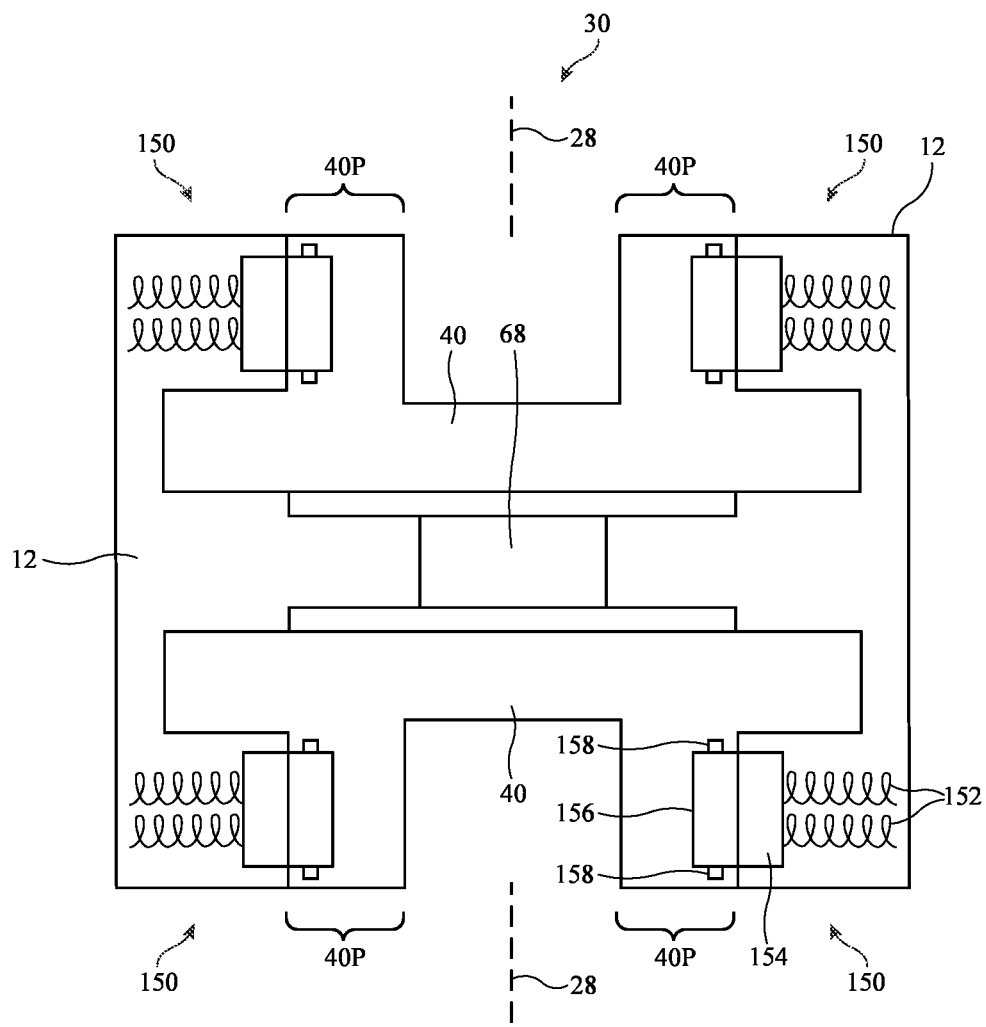
FIG. 16 is a top view of an illustrative hinge with a counterbalance mechanism in accordance with an embodiment.

To help even out the amount of torque required to open and close housing 12 over its allowed range of rotation and thereby improve the user experience when interacting with device 10, hinges 30 may be provided with a counterbalance mechanism. The counterbalance mechanism may provide a torque (sometimes referred to as a closing torque or folding torque) that opposes the unfolding torque of the display. With this counterbalance in place, the folding and unfolding torques will balance each other, so the amount of friction supplied by hinge 30 may potentially be reduced. FIG. 16 is a top view of an illustrative hinge having a counterbalance mechanism (mechanism 150).

As shown in FIG. 16, hinge 30 has friction hinge links 40. Links 40 may have interdigitated fingers and crescent-shaped slots as described in connection with FIGS. 4 and 5. There may be two sets (e.g., two parallel elongated strips) of links 40. A set of linked synchronization gears 68 may be located between these sets of links. Gears 68 span the left and right portions of housing 12 of FIG. 16 and engage with teeth in these housing portions, thereby synchronizing rotational motion between the left and right portions of housing 12 about rotational axis (hinge axis) 28. The presence of sets of links 40 running parallel to gears 68 on opposing sides of gears 68 may help support and stabilize gears 68 during operation.

Counterbalance mechanism 150 may use springs 152 to help counterbalance the unfolding torque applied to device 10 by display 14 as one or more hinges such as hinge 30 are opened and closed. In the example of FIG. 16, each of the four corners of hinge 30 has a pair of springs 152 that press inwardly on a corresponding pad 154 (toward axis 28 and links 40 and away from the adjacent portion of housing 12). This causes each pad 154 to bear against a corresponding roller 156, which is mounted within a respective link portion 40P with a respective roller axle 158.

Figure 17:
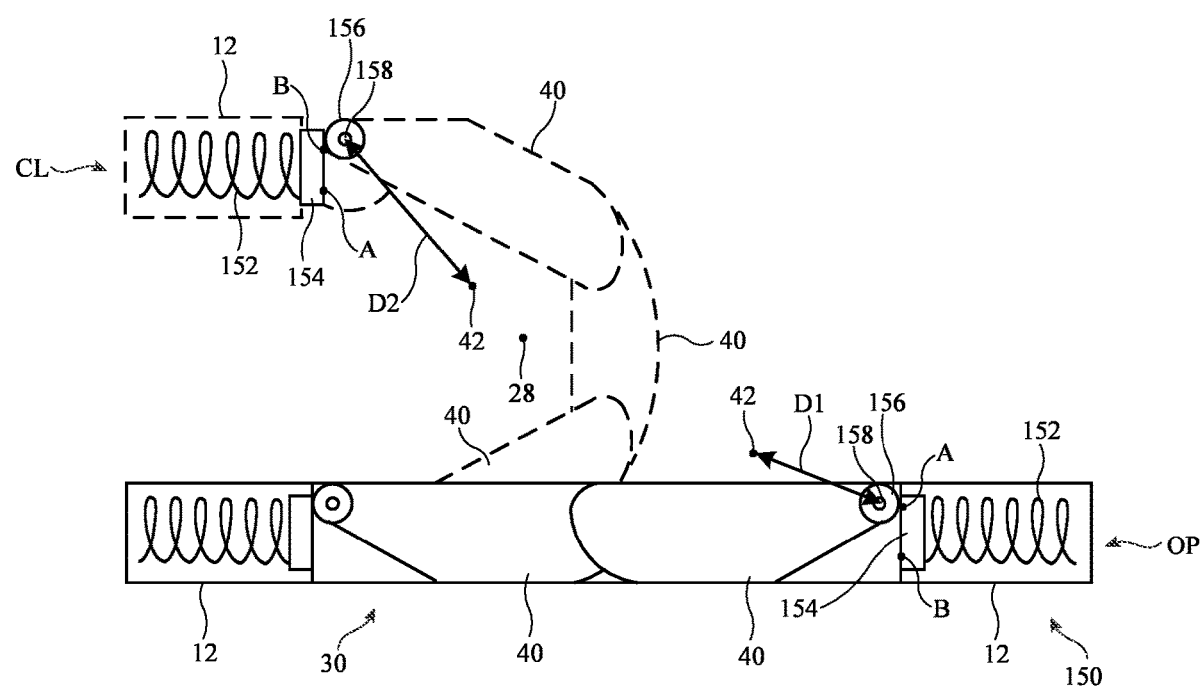
FIG. 17 is a side view of an illustrative hinge with a counterbalance mechanism in accordance with an embodiment.

FIG. 17 illustrates how the folding torque imposed by counterbalance mechanism 150 counteracts the corresponding unfolding torque generated by the folding of display 14 to help even out the amount of torque that a user needs to apply when rotating the left and right portions of housing 12 of device 10 and thereby help reduce the holding force requirements for the friction mechanism of hinge 30.

In the example of FIG. 17, hinge 30 is illustrated in two positions: a fully opened position OP and a fully closed position CL.

In open (unfolded) position OP, links 40 lie flat and roller 156 pushes pad 154 outwardly (away from links 40 toward housing 12). This compresses spring 152 and positions roller 156 so that contact point A between roller 156 and pad 154 is located a first distance D1 from the link rotational axis 42 associated with the link 40 that is attached to roller 156.

In closed (folded) position CL, links 40 are folded back on themselves and bend about axis 28. As shown in FIG. 17, in position CL, roller 156 contacts pad 154 at a contact point B, which is different than contact point A. The distance D2 between link rotational axis 42 and contact point B is less than the distance D1, so that pad 154 is located farther from housing 12 than in open position OP. As a result, spring 152 is allowed to expand and the expansion force generated by spring 152 is reduced. The amount of folding torque produced by the counterbalance mechanism is related to the values of distance D1 and D2 and the expansion force from spring 152, so that the folding torque produced by counterbalance mechanism 150 need not be constant as a function of rotational angle. As an example, there may be more folding torque T tending to close device 10 about axis 28 when device 10 is being opened from position CL and less folding torque when device 10 is in position OP.

FIGS. 18-25 illustrate embodiments for hinge 30 in which links 40 are synchronized using laterally staggered sets of synchronization gear teeth. A first set of gears is located in a first plane and a second set of gears is located in a parallel second plane that is offset from the first plane. During bending, the first and second sets of gears work together to synchronize motion of the first and second portions of housing 12.

Figure 18:
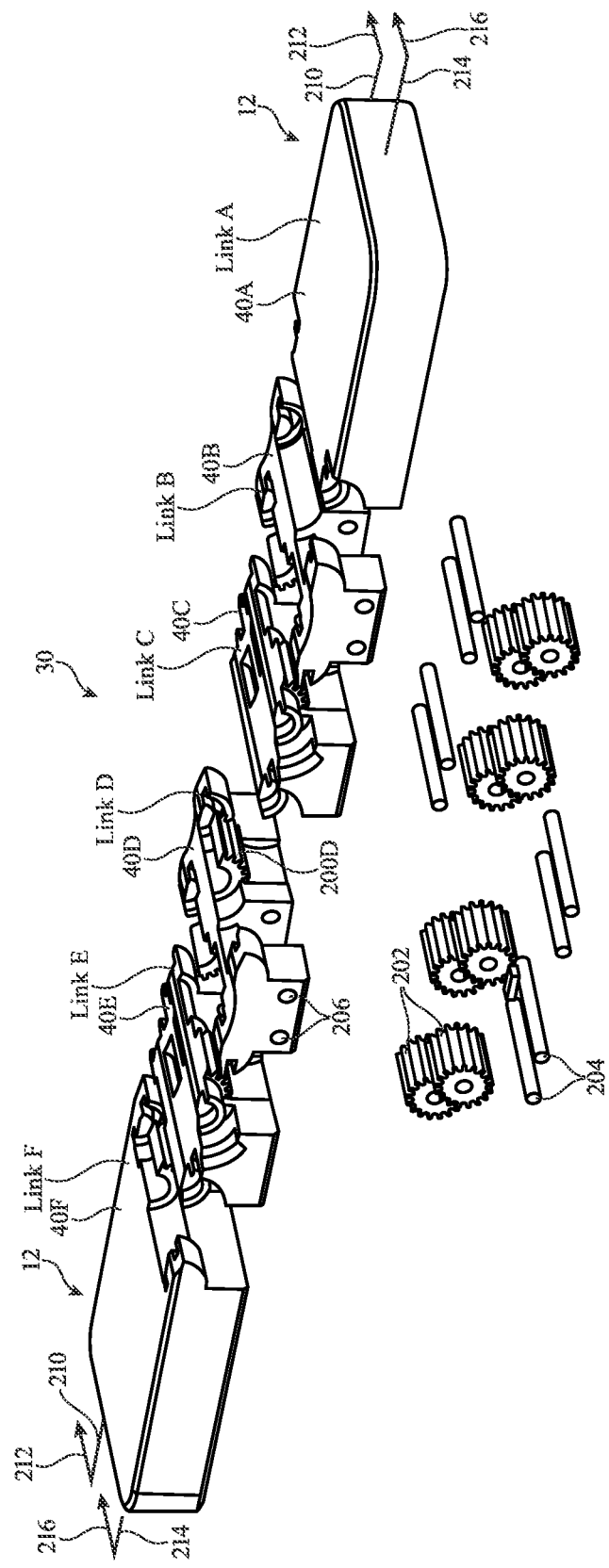
FIG. 18 is an exploded perspective view of an illustrative hinge in accordance with an embodiment.

An exploded perspective view of this type of hinge is shown in FIG. 18. As shown in FIG. 18, hinge 20 has links 40A and 40F that may be formed as integral parts of the first and second housing portions 12 and has a series of coupled intervening links 40E, 40D, 40C, and 40B. During folding of device 10, the rotational motion of the first and second housing portions is synchronized by links 40, so that stress on display 14 is maintained at a desired low amount (e.g., so that the length of display 14 is not changed by the bending of display 14 because the length of display 14 is the same in both its flattened and bent states).

As shown in FIG. 18, links 40 have integral gears—see, e.g., the gear in link 40D formed from gear teeth 200D. Additional gears 202 are mounted in links 40 using shafts 204 that are received in corresponding openings 206 in the frame members that make up the links.

Figure 19:
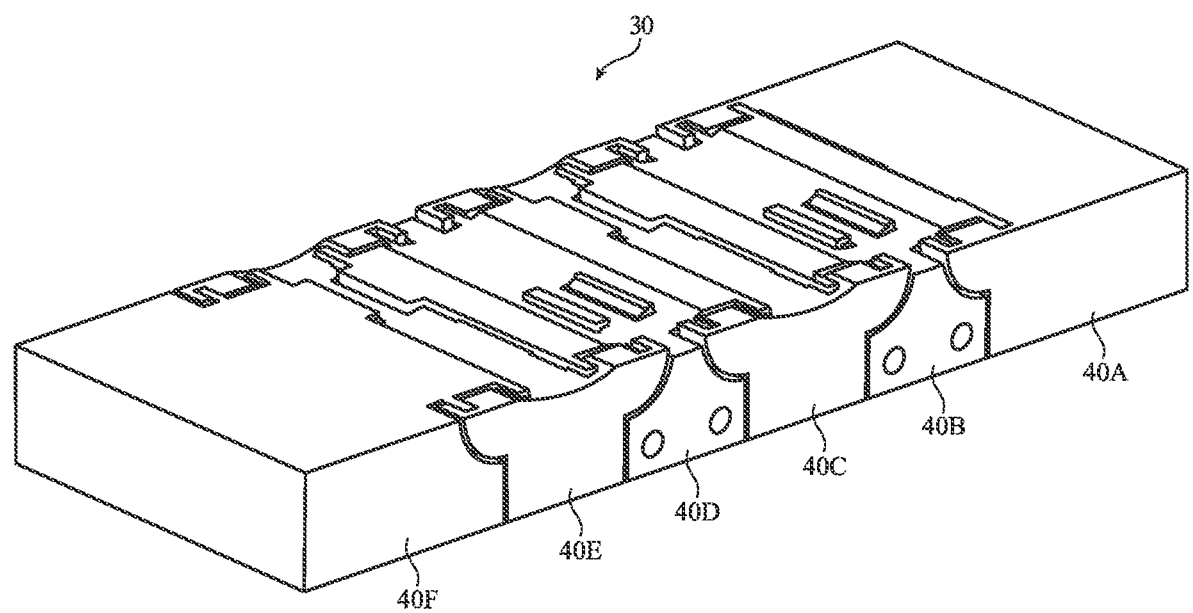
FIG. 19 is a perspective view of an illustrative hinge in accordance with an embodiment.
Figure 20:
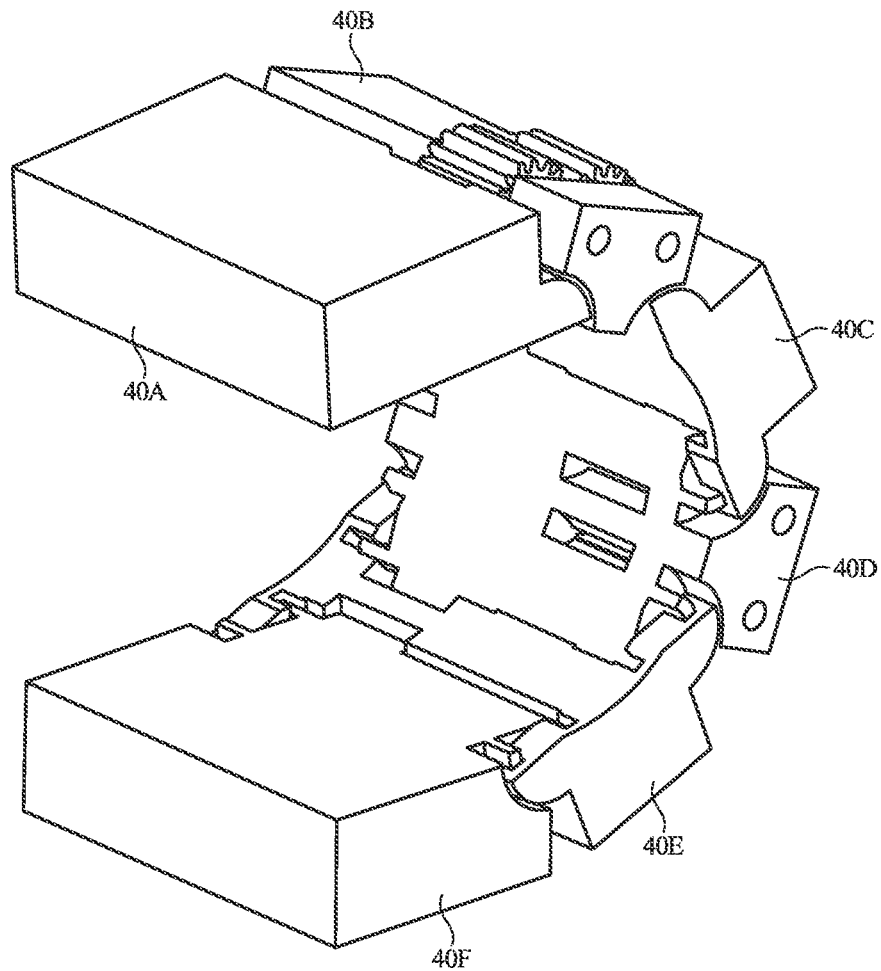
FIG. 20 is a front perspective view of an illustrative bent hinge in accordance with an embodiment.
Figure 21:
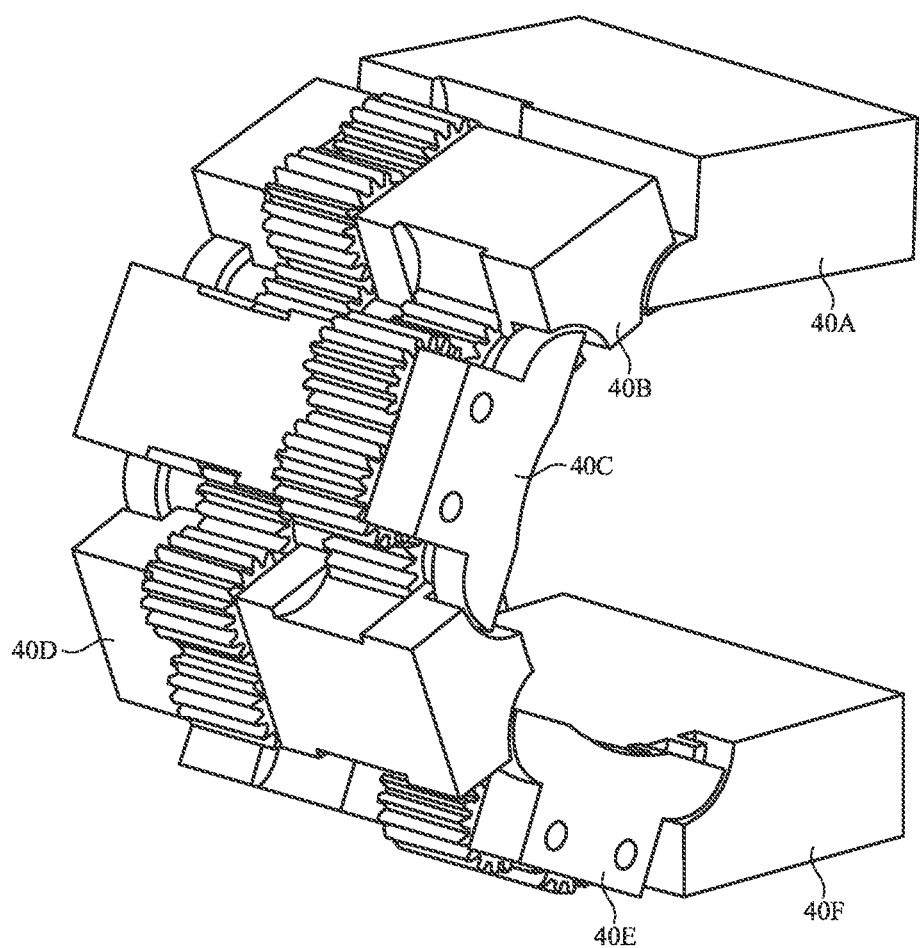
FIG. 21 is a rear perspective view of an illustrative bent hinge in accordance with an embodiment.

FIG. 19 is a perspective view of hinge 30 of FIG. 18 when assembled and lying in its flat (unbent) state. FIG. 20 is a front perspective view of hinge 30 when hinge 30 is in its bent configuration. FIG. 21 is a rear perspective view of hinge 30 when hinge 30 is in its bent configuration.

As shown in FIGS. 18, hinge 30 may have two sets of laterally offset synchronization gears that run in parallel between the first and second housing portions. A first of the two sets of gears lies in a plane running along line 210 of FIG. 18. A second of the two sets of gears lies in a parallel plane running along line 214 of FIG. 18 (e.g., a plane that is laterally offset parallel from the plane of the first gear set along a direction parallel to the bend axis).

Figure 22:
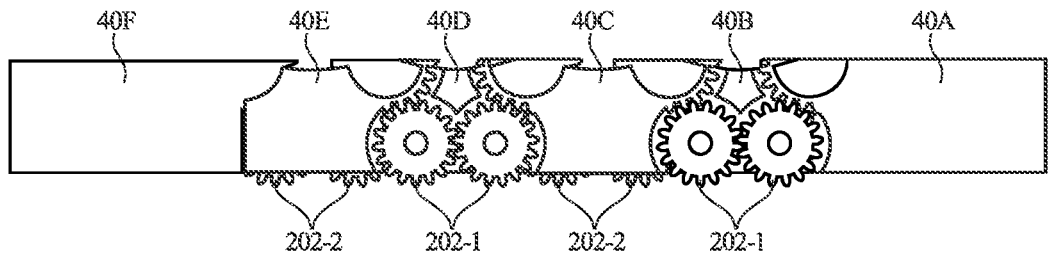
FIG. 22 is a cross-sectional side view of an illustrative hinge in accordance with an embodiment.

FIG. 22 is a cross-sectional side view of an illustrative portion of hinge 30 taken along line 210 of FIG. 18 and viewed in direction 212. As shown in FIG. 22, hinge 30 has first gears 202-1 that lie in a first plane that includes line 210.

Hinge 30 also has second gears 202-2 that lie in a second plane that includes line 214. Hinge 30 is unbent in the configuration of FIG. 22. Links 40 include alternating odd and even links (e.g., odd links 40F, 40D, and 40B and even links 40E, 40C, and 40A).

Figure 23:
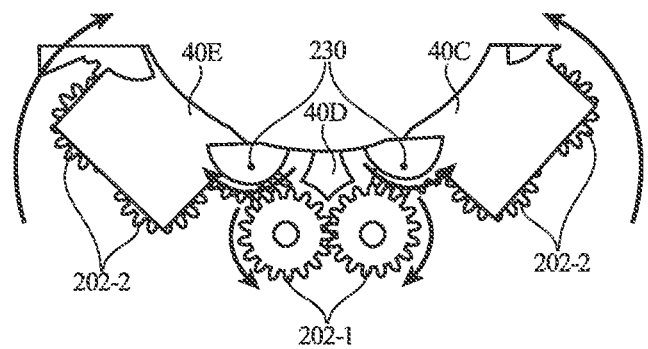
FIG. 23 is a cross-sectional side view of a portion of the illustrative hinge of FIG. 22 in a bent state in accordance with an embodiment.

FIG. 23 shows a portion of hinge 30 of FIG. 22 in a bent hinge configuration. As shown in FIG. 23, gears 202-1 in the first plane that includes line 210 are used to synchronize rotational movement of the even links (e.g., links 40E and 40C in the example of FIG. 23) as these links rotate about axes 230.

Figure 24:
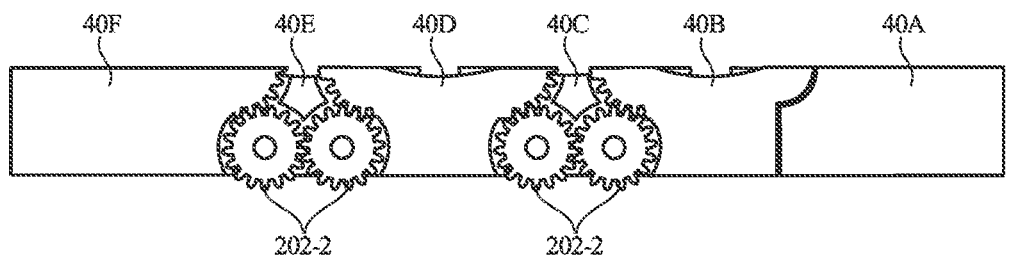
FIG. 24 is a cross-sectional side view of the illustrative hinge of FIG. 22 taken through a parallel plane in accordance with an embodiment.

FIG. 24 is a cross-sectional side view of an illustrative portion of hinge 30 taken along line 214 of FIG. 18 and viewed in direction 216. FIG. 24 shows how second gears 202-2, which lie in the second plane that includes line 214 of FIG. 18, are coupled between the odd links of hinge 30 (e.g., odd links 40F, 40D, and 40B).

Figure 25:
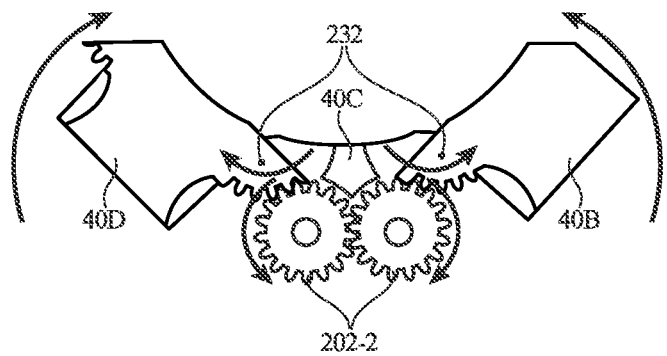
FIG. 25 is a cross-sectional side view of the illustrative hinge of FIG. 24 in a bent state in accordance with an embodiment.

FIG. 25 shows a portion of hinge 30 of FIG. 24 in a bent hinge configuration. As shown in FIG. 25, gears 202-2 in the second plane are used to synchronize rotational movement of the odd links (e.g., links 40D and 40B in the example of FIG. 25, which rotate about axes 232).

As the example of FIGS. 18-25 demonstrates, hinge structures in device 10 may include a rotational synchronization mechanism with two sets of gear couplings lying in parallel planes. Each pair of gears synchronizes rotation between a left-hand adjacent link and a corresponding right-hand adjacent link. As an example, gears 202-1 of FIG. 23 synchronize rotation between link 40E on the left of link 40D (which holds gears 202-1) and link 30C on the right. The first gears are used in synchronizing motion of the odd links (e.g., gears 202-1 mounted on link 40D are used to synchronize motion of links 40E and 40C). By using two staggered parallel gear sets, all links 40 in hinge 30 can be synchronized, even when those links are far from each other (e.g., rotation of link 40F rotates link 30D, which in turn rotates ink 40B and rotation of link 40E rotates link 30C, which in turn rotates link 40A). The gear structures of hinge 30 thereby synchronize rotation of the first portion of housing 12 (which may be attached to link 40F or formed as part of link 40F) with rotation of the second portion of housing 12 (which may be attached to link 40A or formed as part of link 40A).

The gears of the hinge of FIGS. 18-25 may be used as a synchronization mechanism that is located between a pair of parallel strips of friction hinges with interdigitated fingers as described in connection with FIG. 16, may be used as a hinge in device 10 in place of friction hinges with interdigitated fingers, may be used in the same device that includes one or more friction hinges with interdigitated fingers elsewhere in the device, and/or may otherwise be used in folding device structures to form a hinge that synchronizes rotational motion between folded housing portions.

Figure 26:
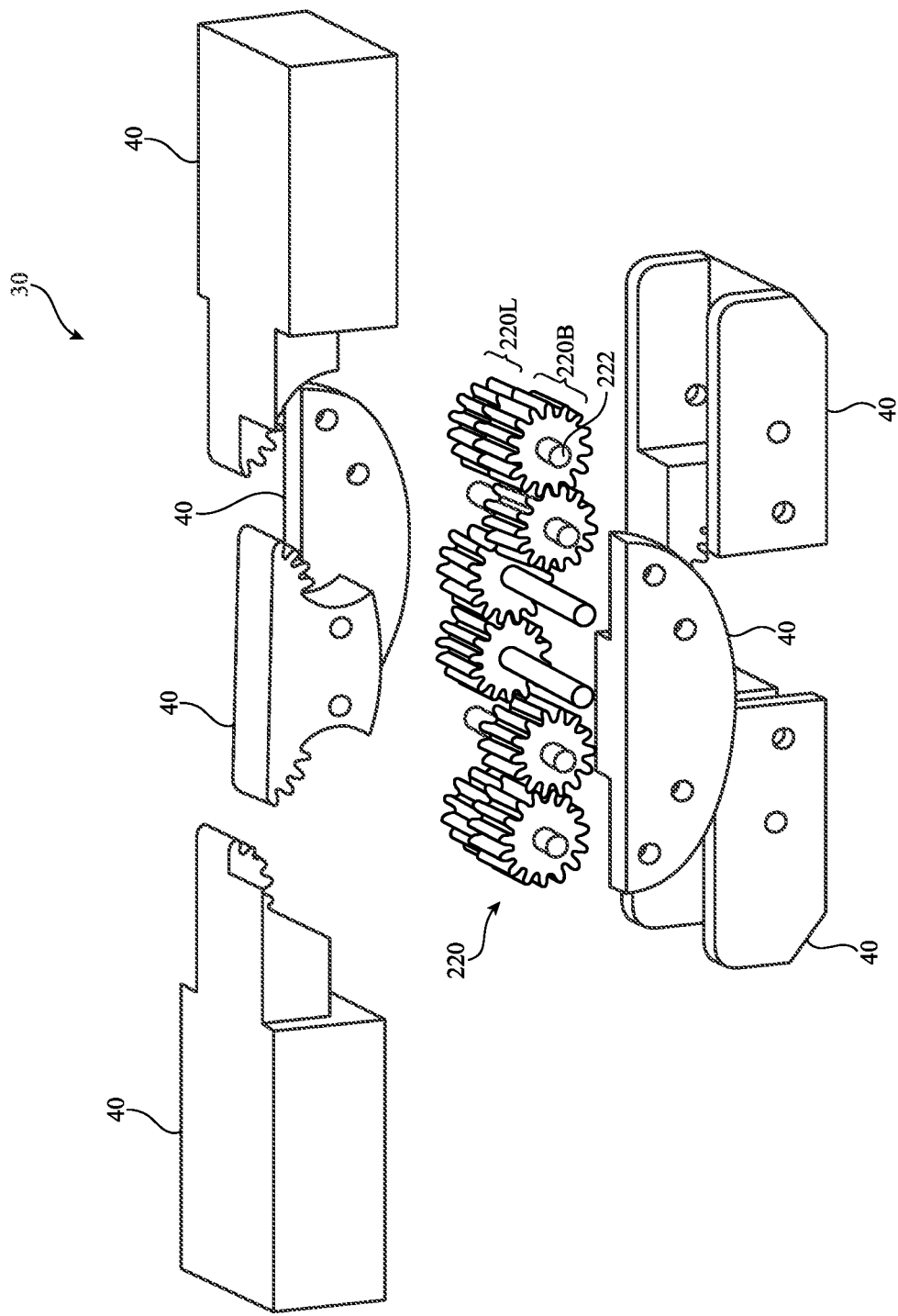
FIG. 26 is an exploded perspective view of another illustrative hinge in accordance with an embodiment.
Figure 27:
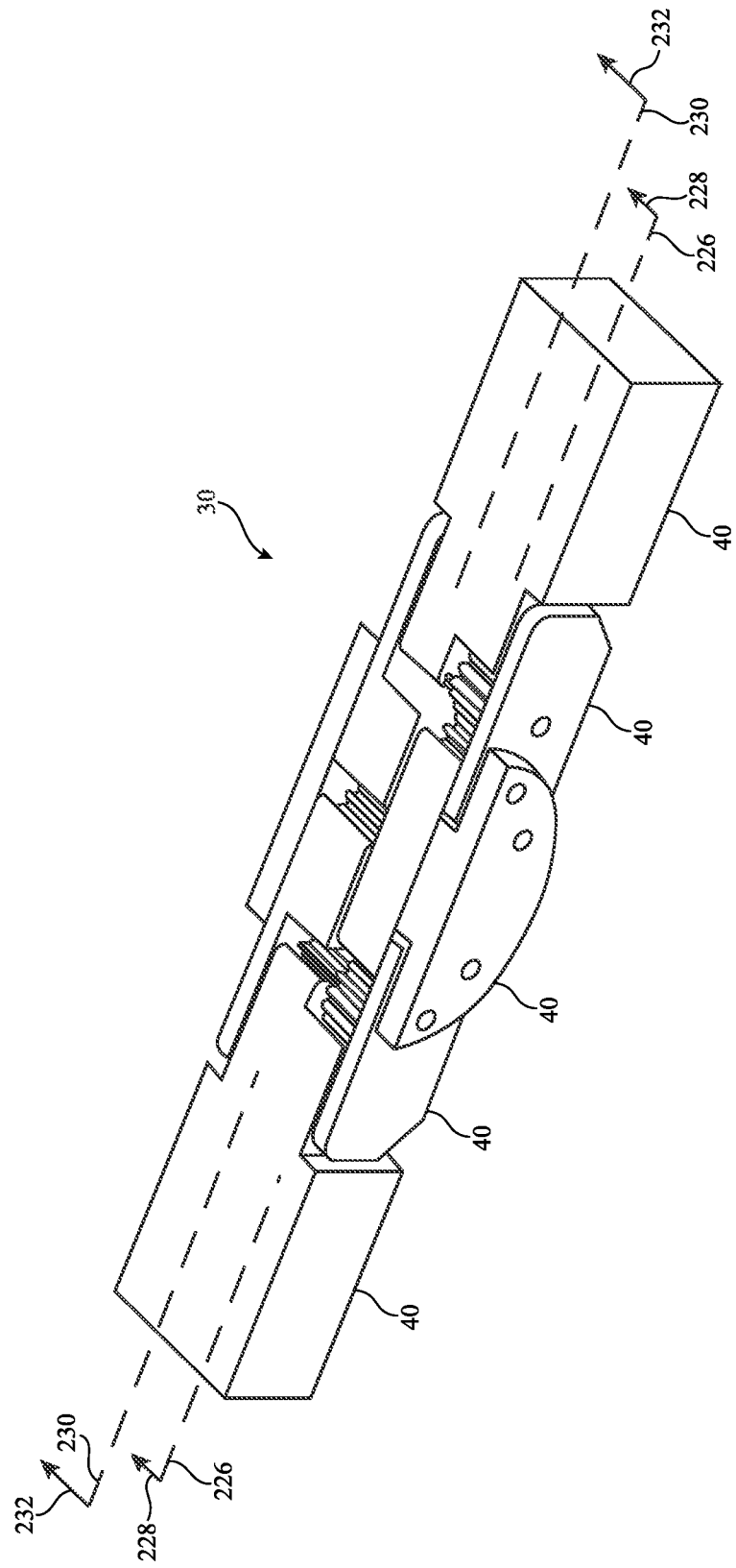
FIG. 27 is a front perspective view of the illustrative hinge of FIG. 26 in accordance with an embodiment.
Figure 28:
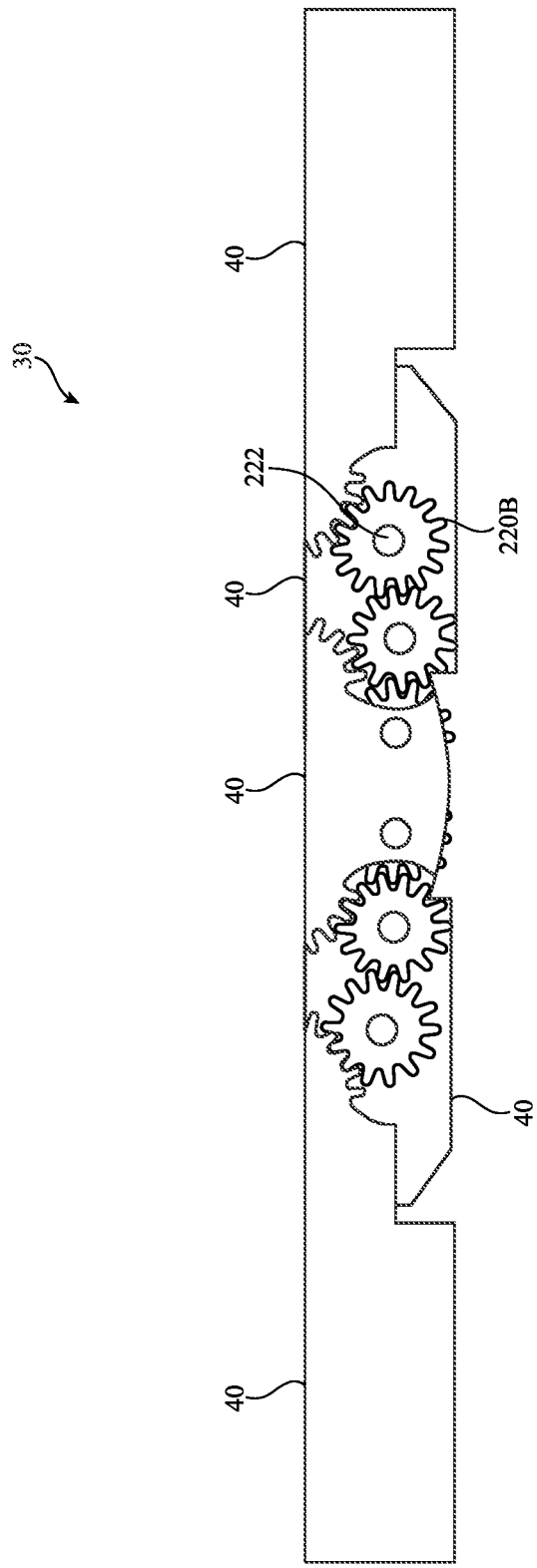
FIGS. 28 and 29 are cross-sectional side views of the illustrative hinge of FIG. 26 in accordance with embodiments.
Figure 29:
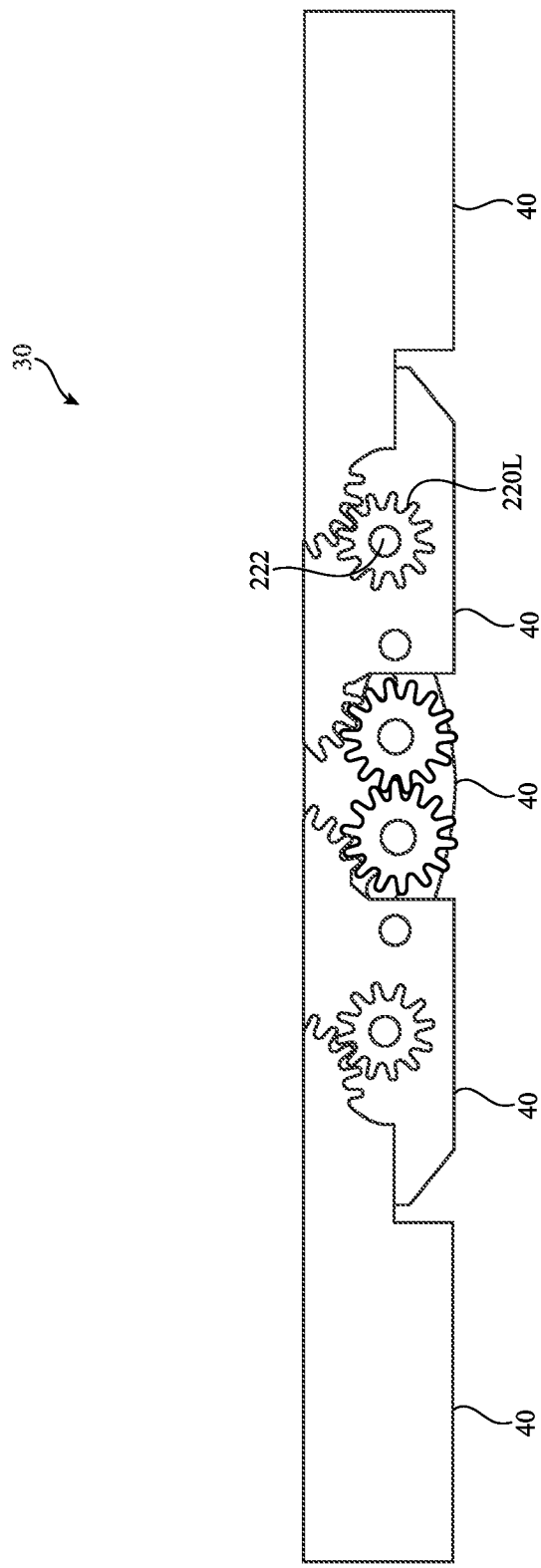

FIG. 26 is an exploded perspective view of another illustrative hinge in accordance with an embodiment. As shown in FIG. 26, some of synchronization gears 220 of hinge 30 may have gear portions of different diameters mounted on a common axle (see, e.g., smaller gear 220L and larger gear 220B on common axle 222 of FIG. 26). The gear ratio established by the ratio of the number of teeth in gear 220B to the number of teeth in gear 220L is not 1:1, which causes different pairs of adjacent links 40 to rotate by different amounts relative to each other as device 10 is folded to transition from its flat opened state to its folded closed state). FIG. 27 is a front perspective view of illustrative hinge 30 of FIG. 26 in the open (flat) state. FIG. 28 is a cross-sectional view of hinge 30 of FIG. 27 taken along line 226 of FIG. 27 and viewed in direction 228, which shows the presence of larger gear portion 220B on axle 222. FIG. 29 is a cross-sectional side view of hinge 30 of FIG. 27 taken along line 230 of FIG. 27 and viewed in direction 232, which shows the presence of smaller gear portion 220L on shared axle 222.

Figure 30:
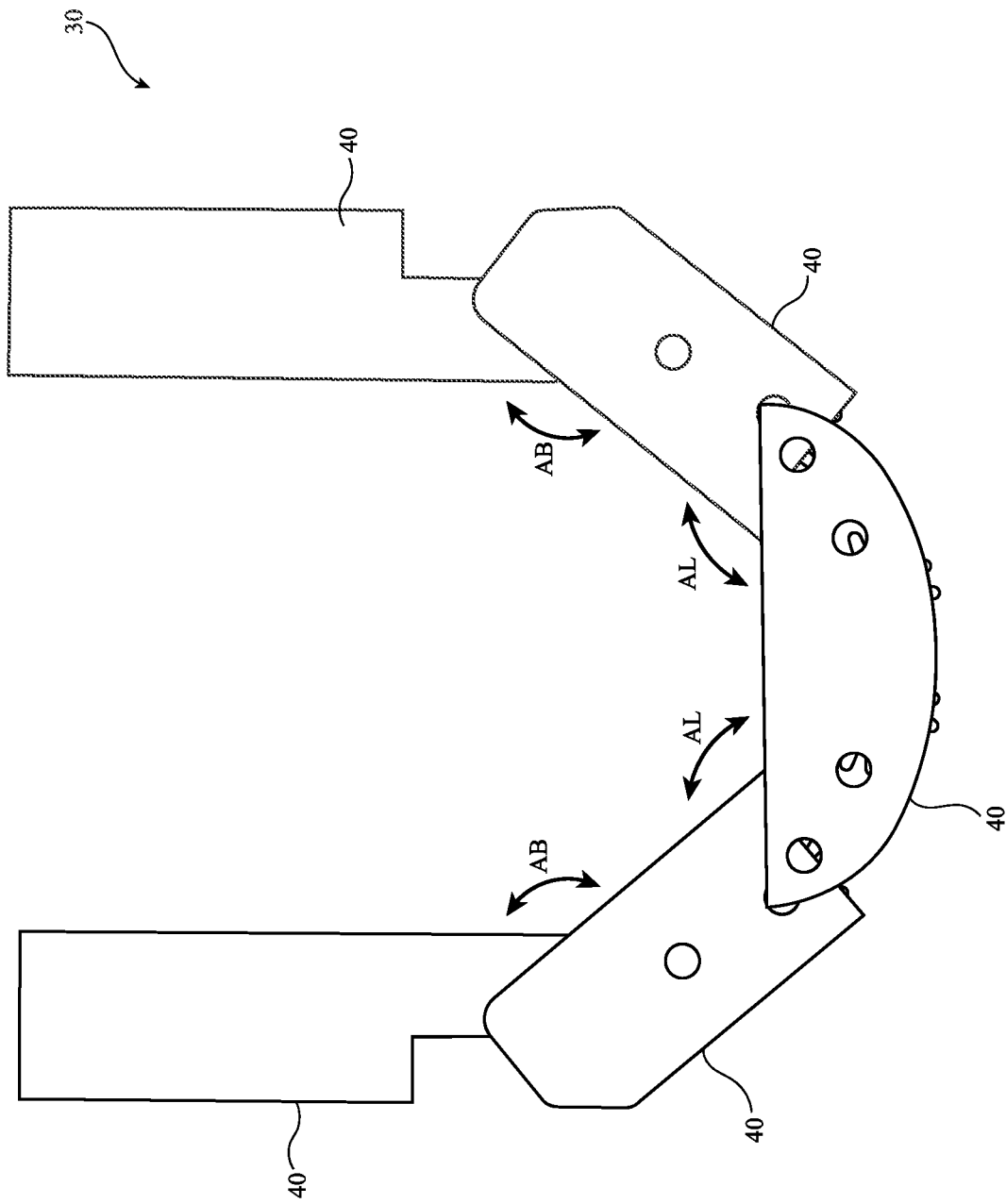
FIG. 30 is a side view of the illustrative hinge of FIG. 26 in a bent state in accordance with an embodiment.

The uneven gear ratio presented by the different sizes of gears 220B and 220L allows different portions of hinge 30 to rotate by different amounts as hinge 30 is folded. As shown in FIG. 30, for example, which shows hinge 30 in its folded configuration, the outermost pairs of links 40 in hinge 30 may, when folded, rotate with respect to each other by a value of 180°-AB, whereas the innermost pairs of links 40 in hinge 30 (the links closes to the center of hinge 30) may rotate by a value of 180°-AL. The value of rotation angle 180°-AB may be, as an example, 40° or other suitable value, whereas the value of rotation angle 180°-AL may be, as an example, 50° or other suitable value that is different (e.g., greater than) the value of rotation angle 180°-AB. The use of different rotation angle values at different locations across hinge 30 may help allow hinge 30 to be compact while accommodating the curved shape of panel 14P when folded.

As with the gears of the hinge of FIGS. 18-25, the gears of the hinge of FIGS. 26-30 may be used as a synchronization mechanism that is located between a pair of parallel strips of friction hinges with interdigitated fingers as described in connection with FIG. 16, may be used as a hinge in device 10 in place of friction hinges with interdigitated fingers, may be used in the same device that includes one or more friction hinges with interdigitated fingers elsewhere in the device, and/or may otherwise be used in folding device structures to form a hinge that synchronizes rotational motion between folded housing portions.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   a foldable housing that is configured to bend about a bend axis;
   a flexible display panel that overlaps the bend axis; and
   a hinge having multiple links, wherein the links include pairs of links that rotate relative to each other about a rotation axis that lies outside of the links, wherein the links have friction clutch structures, wherein the hinge comprises pins, wherein the links have curved slots that receive the pins, and wherein the friction clutch structures of the links comprise interdigitated fingers.

2. The electronic device defined in claim 1 wherein the curved slots are crescent-shaped.

3. The electronic device defined in claim 1 wherein the curved slots are formed in the interdigitated fingers.

4. The electronic device defined in claim 1 wherein the pins slide within the curved slots as the links rotate relative to each other.

5. The electronic device defined in claim 1, wherein the interdigitated fingers comprise a first set of fingers and a second set of fingers that are interdigitated with each other.

6. The electronic device defined in claim 5, wherein the pins are configured to press the interdigitated fingers towards each other.

7. The electronic device defined in claim 5, wherein the foldable housing comprises a hinge mounting member to which the first set of fingers is attached.

8. The electronic device defined in claim 7, wherein the first set of fingers is mounted in a recess of the hinge mounting member under a mounting plate.

9. An electronic device, comprising:
   a housing having a first housing half and a second housing half that are configured to rotate relative to each other about a bend axis;
   a foldable display configured to bend about the bend axis, wherein a first portion of the foldable display is mounted to the first housing half and a second portion of the foldable display is mounted to the second housing half;
   a hinge with multiple links, wherein a first of the links is attached to the first housing half and a second of the links is attached to the second housing half, wherein adjacent pairs of the links each rotate about a respective rotation axis that is outside of the hinge, and wherein the links are formed from interdigitated fingers that form friction clutch structures; and
   a rotation synchronization mechanism coupled between the first and second housing halves.

10. The electronic device defined in claim 9 further comprising crescent-shaped slots in the interdigitated fingers that receive pins.

11. The electronic device defined in claim 10 wherein the crescent-shaped slots have ends that prevent excessive rotation of the links with respect to each other.

12. The electronic device defined in claim 9 wherein the rotation synchronization mechanism comprises rotation synchronization gears.

13. The electronic device defined in claim 12 wherein a first of the rotation synchronization gears is attached to the first housing half and wherein a second of the rotation synchronization gears is attached to the second housing half.

14. The electronic device defined in claim 13 wherein the rotation synchronization gears are configured so that clockwise rotation of the first rotation synchronization gear due to clockwise rotation of the first portion produces counter-clockwise rotation of the second rotation synchronization gear and counterclockwise rotation of the second portion.

15. An electronic device, comprising:
a first housing portion;
a second housing portion configured to rotate about a bend axis relative to the first housing portion;
a flexible display having a first display portion coupled to the first housing portion and a second display portion coupled to the second housing portion, wherein when the first and second housing portions are folded against each other, the flexible display is bent about the bend axis and exhibits an unfolding torque to unfold the first and second housing portions; and
a hinge having interconnected links, wherein the interconnected links include pairs of adjacent links, wherein the adjacent links in each of the pairs rotate with respect to each other about a rotation axis that lies within the flexible display, wherein each of the rotation axes is parallel to the bend axis, wherein the interconnected links are configured to form a friction clutch for the hinge, and wherein the hinge comprises a counterbalance mechanism configured to provide a folding torque that tends to fold the first and second housing portions about the bend axis to counterbalance the unfolding torque.

16. The electronic device defined in claim 15 wherein the links each have fingers with crescent-shaped slots, wherein the fingers of the adjacent links of each of the pairs are interdigitated, and wherein the hinge comprises pins that slide along the crescent-shaped slots.

17. The electronic device defined in claim 15 wherein the links comprise curved bearing surfaces that bear against each other to allow rotation of the adjacent links in each of the pairs with respect to each other.

18. The electronic device defined in claim 15 further comprising a camera at an edge of the second housing portion, wherein the flexible display is configured to cover the camera when the first and second housing portions are folded against each other and is configured to retract and expose the camera when the first and second housing portions are unfolded.

19. The electronic device defined in claim 15 further comprising speakers at corners of the first and second housing portions.

20. The electronic device defined in claim 15 further comprising a two-dimensional array of haptic output devices overlapped by the flexible display.

21. The electronic device defined in claim 15 wherein the counterbalance mechanism comprises a pad, a spring coupled to the pad, and a roller that is mounted on a portion of the interconnected links and that bears against the pad.

22. The electronic device defined in claim 21 wherein the first and second housing portions are configured to rotate relative to each other about the bend axis between an open position and a closed position, wherein in the closed position the roller positions the pad to allow the spring to uncompress relative to the open position.

23. The electronic device defined in claim 15 wherein the links each have fingers with crescent-shaped slots, wherein the fingers of the adjacent links of each of the pairs are interdigitated, wherein the hinge comprises pins that slide along the crescent-shaped slots, and wherein the hinge has parallel first and second elongated strips of links and comprises synchronization gears located between the first and second elongated strips.

24. An electronic device, comprising:
a foldable housing that is configured to bend about a bend axis;
a flexible display panel that overlaps the bend axis; and
a hinge having multiple links, wherein the hinge extends across the bend axis and couples first and second portions of the foldable housing together, wherein the links include a first set of rotational synchronization gears that synchronize rotation of odd links in the multiple links and include a staggered parallel second set of rotational synchronization gears that synchronize rotation of even links in the multiple links.

25. The electronic device defined in claim 24 wherein the multiple links include at least a first pair of links and second pair of links, wherein the first and second sets of rotational synchronization gears are configured so that the links in the first pair of links rotate relative to each other by a first angular value when the foldable housing is placed in a folded state and so that the links in the second pair of links rotate relative to each other by a second angular value when the foldable housing is placed in the folded state, and wherein the first and second angular values are different.

26. An electronic device, comprising:
a foldable housing that is configured to bend about a bend axis;
a flexible display panel that overlaps the bend axis; and
a hinge having a first link with an outwardly facing curved surface and an inwardly facing curved surface, having a second link with an inwardly facing curved surface, and having a retention member with an outwardly facing curved surface configured to slide along the inwardly facing curved surface of the first link, wherein the retention member holds the inwardly facing curved surface of the second link against the outwardly facing curved surface of the first link and wherein the hinge includes an attachment member with a first portion attached to the second link and a second portion attached to the retention member.

* * * * *